United States Patent
Wada et al.

(10) Patent No.: US 10,715,744 B2
(45) Date of Patent: Jul. 14, 2020

(54) VEHICULAR DISPLAY CONTROL DEVICE, VEHICULAR DISPLAY SYSTEM, VEHICULAR DISPLAY CONTROL METHOD, AND NON-TRANSITORY STORAGE MEDIUM

(71) Applicant: JVC KENWOOD Corporation, Yokohama-shi, Kanagawa-ku (JP)

(72) Inventors: Yuki Wada, Yokohama (JP); Takuji Teruuchi, Yokohama (JP); Toshiya Endo, Yokohama (JP); Takeshi Yamazaki, Yokohama (JP); Hiroki Takahashi, Yokohama (JP)

(73) Assignee: JVC KENWOOD Corporation, Yokohama-Shi (JP)

( * ) Notice: Subject to any disclaimer, the term of this patent is extended or adjusted under 35 U.S.C. 154(b) by 0 days.

(21) Appl. No.: 16/182,710

(22) Filed: Nov. 7, 2018

(65) Prior Publication Data
US 2019/0075253 A1    Mar. 7, 2019

Related U.S. Application Data

(63) Continuation of application No. PCT/JP2017/015634, filed on Apr. 18, 2017.

(30) Foreign Application Priority Data

Sep. 8, 2016  (JP) .................. 2016-175244

(51) Int. Cl.
*H04N 5/262* (2006.01)
*H04N 5/232* (2006.01)
(Continued)

(52) U.S. Cl.
CPC ............. *H04N 5/2628* (2013.01); *B60R 1/00* (2013.01); *G06K 9/00335* (2013.01);
(Continued)

(58) Field of Classification Search
CPC .... H04N 5/2628; H04N 5/23293; G06T 7/20; G06T 7/70; G06T 2207/30196; B60R 1/00; B60R 2300/8066
(Continued)

(56) References Cited

U.S. PATENT DOCUMENTS 10,116,873 B1 * 10/2018 Campbell .......... H04N 5/23296
2010/0214105 A1 * 8/2010 Manotas, Jr. .......... A61B 3/113
340/575
(Continued)

FOREIGN PATENT DOCUMENTS

JP    2005-004414    1/2005
JP    2008-018760    1/2008
(Continued)

OTHER PUBLICATIONS

International Search Report and Written Opinion for International Patent Application No. PCT/JP2017/015634 dated Jul. 18, 2017, 11 pages.

*Primary Examiner* — Zaihan Jiang
(74) *Attorney, Agent, or Firm* — Amin, Turocy & Watson, LLP

(57) ABSTRACT

A vehicular display control device includes a video acquiring unit configured to acquire video data captured by a rear camera configured to capture a rear view of a vehicle, a frequency detecting unit configured to detect a frequency of a driver's action in the vehicle for changing a range of view with respect to a display installed in front of the driver, a video data generating unit configured to clip, when the frequency of the driver's action detected by the frequency detecting unit becomes high, a clipping range in the captured video data acquired by the video acquiring unit wider than a clipping range before the frequency of the driver's action becomes high to generate video data for a predetermined time, and a display controller configured to cause a display (Continued)

| FREQUENCY OF MOVEMENT OF DRIVER'S HEAD | CLIPPING RANGE |
|---|---|
| ZERO IN TEN SECONDS | NARROW |
| ONE OR MORE TIMES AND LESS THAN TWICE IN TEN SECONDS | NORMAL |
| TWO OR MORE TIMES IN TEN SECONDS | WIDE | installed in front of the driver to display the video data generated by the video data generating unit.

10 Claims, 17 Drawing Sheets

(51) Int. Cl.
    *G06T 7/20*     (2017.01)
    *G06T 7/70*     (2017.01)
    *B60R 1/00*     (2006.01)
    *G06K 9/00*     (2006.01)
    *H04N 5/247*     (2006.01)
    *H04N 7/18*     (2006.01)

(52) U.S. Cl.
    CPC ..... *G06K 9/00597* (2013.01); *G06K 9/00845* (2013.01); *G06T 7/20* (2013.01); *G06T 7/70* (2017.01); *H04N 5/23293* (2013.01); *H04N 5/23296* (2013.01); *H04N 5/247* (2013.01); *H04N 7/183* (2013.01); *B60R 2300/306* (2013.01); *B60R 2300/8066* (2013.01); *G06T 2207/30196* (2013.01)

(58) Field of Classification Search
    USPC .......................................................... 348/148
    See application file for complete search history.

(56) References Cited

U.S. PATENT DOCUMENTS

| | | | |
|---|---|---|---|
| 2012/0169875 A1 | 7/2012 | Matsukawa et al. | |
| 2013/0314503 A1* | 11/2013 | Nix | G06K 9/00805 348/46 |
| 2014/0214271 A1* | 7/2014 | Choi | B60R 1/002 701/36 |
| 2014/0267727 A1* | 9/2014 | Alaniz | B60R 1/00 348/148 |
| 2015/0012185 A1* | 1/2015 | Harda | B60W 30/08 701/45 |
| 2015/0055120 A1* | 2/2015 | Le | G03B 3/10 356/28 |
| 2017/0001648 A1* | 1/2017 | An | B60W 30/09 |
| 2017/0129405 A1* | 5/2017 | Oba | B60R 1/00 |
| 2017/0132480 A1* | 5/2017 | Han | H04N 5/247 |
| 2017/0300162 A1* | 10/2017 | Jang | G06F 3/0416 |
| 2017/0305349 A1* | 10/2017 | Naboulsi | B60R 1/025 |
| 2019/0126824 A1* | 5/2019 | Oba | B60R 1/00 |

FOREIGN PATENT DOCUMENTS

| | | |
|---|---|---|
| JP | 2010-179850 | 8/2010 |
| JP | 2012-140106 | 7/2012 |
| JP | 2014-045265 | 3/2014 |

\* cited by examiner

FIG.6

| FREQUENCY OF MOVEMENT OF DRIVER'S HEAD | CLIPPING RANGE |
|---|---|
| ZERO IN TEN SECONDS | NARROW |
| ONE OR MORE TIMES AND LESS THAN TWICE IN TEN SECONDS | NORMAL |
| TWO OR MORE TIMES IN TEN SECONDS | WIDE |

FIG.7

| FREQUENCY OF MOVEMENT OF DRIVER'S HEAD | CLIPPING RANGE |
|---|---|
| ZERO AS ACCUMULATED | NARROW |
| ONE OR MORE TIMES AND LESS THAN TEN TIMES AS ACCUMULATED | NORMAL |
| TEN OR MORE TIMES AS ACCUMULATED | WIDE |

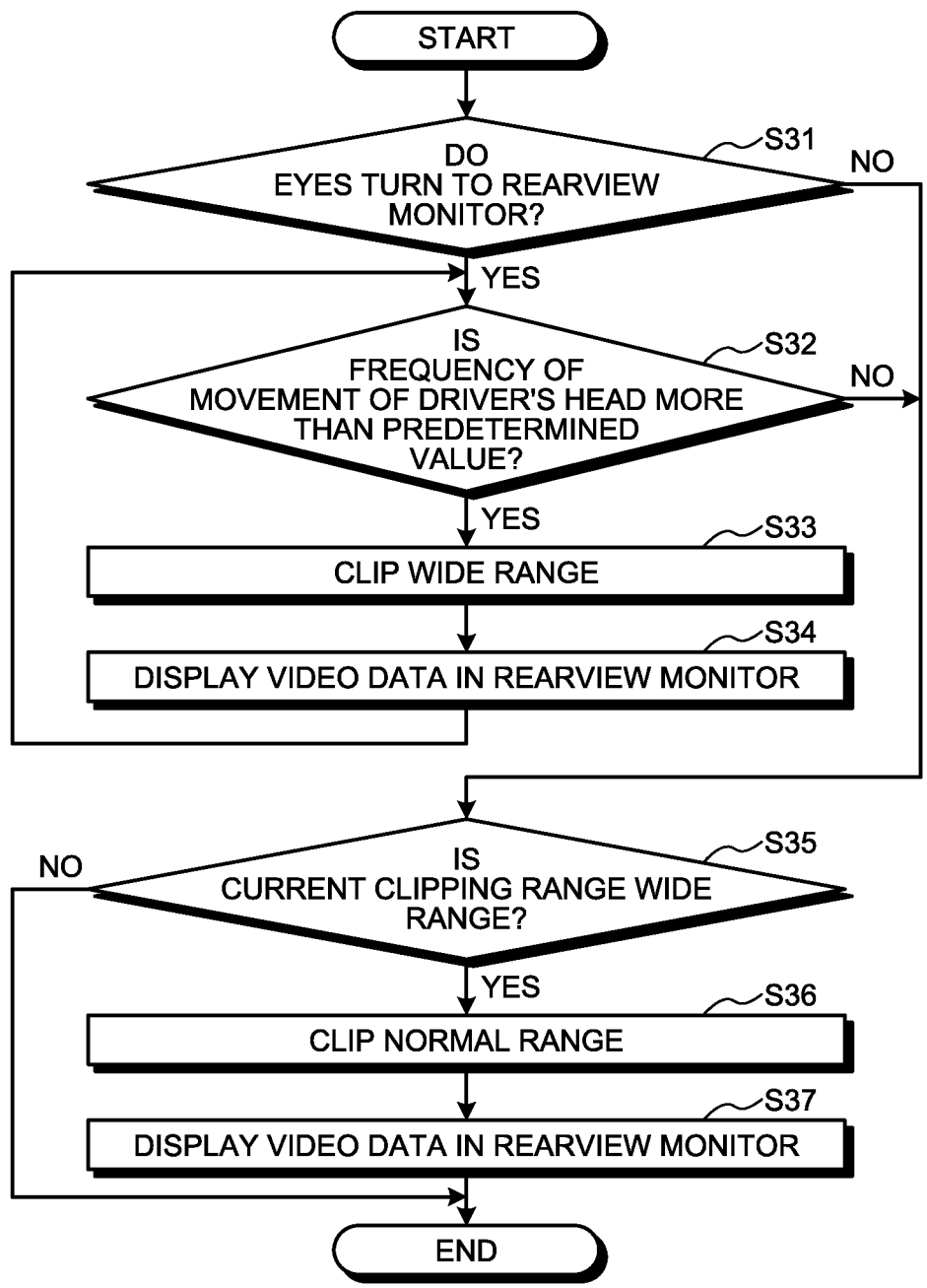

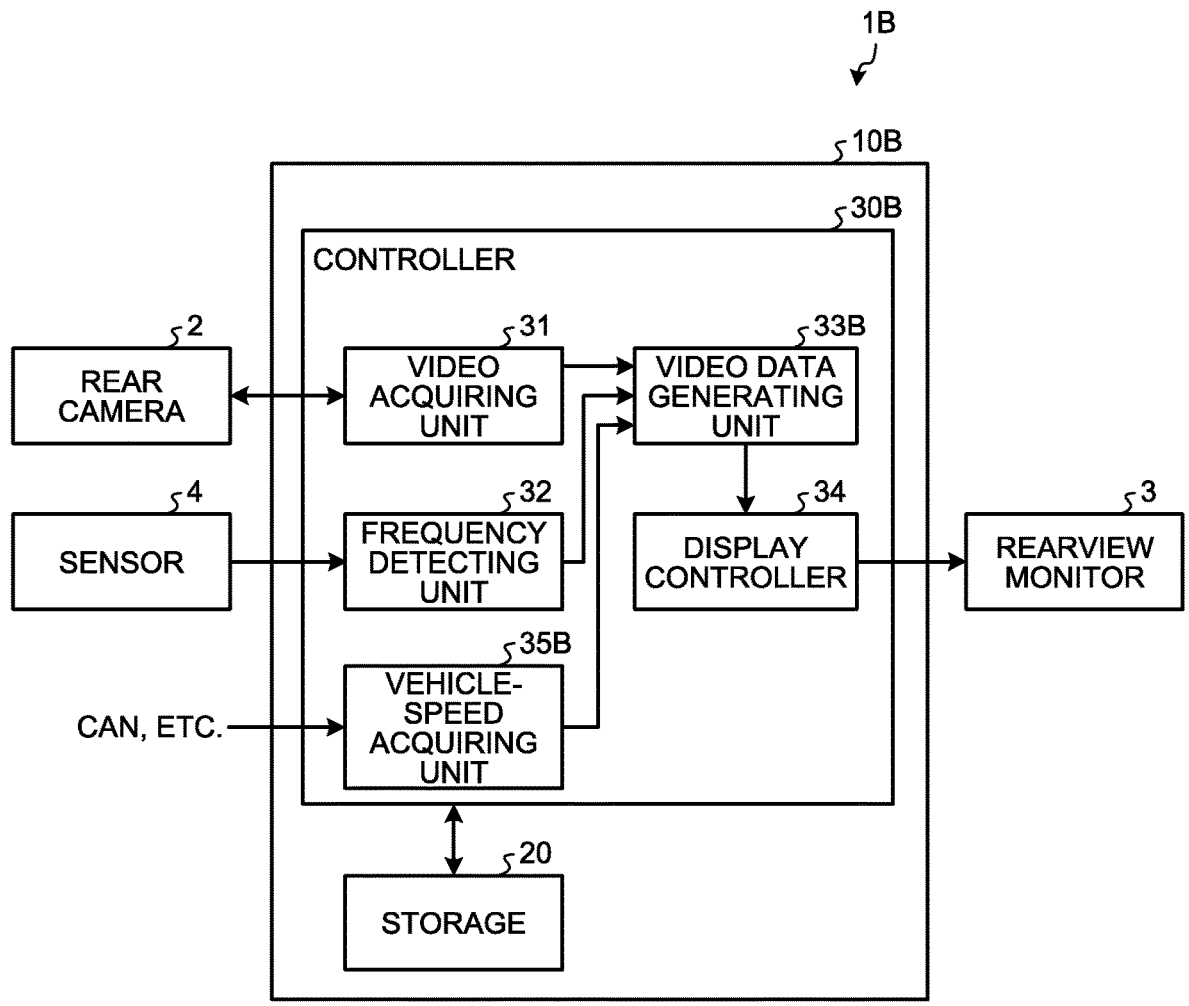

120C 120B 120A 110

L   120A

VEHICULAR DISPLAY CONTROL DEVICE, VEHICULAR DISPLAY SYSTEM, VEHICULAR DISPLAY CONTROL METHOD, AND NON-TRANSITORY STORAGE MEDIUM

CROSS-REFERENCE TO RELATED APPLICATIONS

This application is a Continuation of International Application No. PCT/JP2017/015634, filed on Apr. 18, 2017 which claims the benefit of priority of the prior Japanese Patent Application No. 2016-175244, filed on Sep. 8, 2016, the entire contents of both of which are incorporated herein by reference.

FIELD

The present application relates to a vehicular display control device, a vehicular display system, a vehicular display control method, and a non-transitory storage medium.

BACKGROUND

There is a known technology of capturing surrounding areas behind a vehicle with a rear camera instead of a conventional optical rearview mirror and presenting them on a display. There is a known technology of detecting positions of eyes of a driver or movements of the eyes and, in accordance with a detection result, changing a position of a display area to be presented on a display (for example, see Japanese Laid-open Patent Publication No. 2014-045265).

With a conventional optical rearview mirror, when a driver moves his head from side to side, a range formed by a virtual image changes, and therefore a range wider than an area of the actual mirror may be viewed. However, an electric mirror displays an actual image of a two-dimensional video which is different from a virtual image by the conventional optical rearview mirrors. Therefore, the driver who used to use a conventional optical rearview mirror may take unconscious action to move his head for changing the range of view so as to obtain necessary information. Thus, there is a demand to provide appropriate required information for a driver in accordance with the driver's unconscious action.

SUMMARY

A vehicular display control device, a vehicular display system, a vehicular display control method, and a non-transitory storage medium are disclosed.

According to one aspect, there is provided a vehicular display control device comprising: a video acquiring unit configured to acquire video data captured by a rear camera configured to capture a rear view of a vehicle; a frequency detecting unit configured to detect a frequency of a driver's action in the vehicle for changing a range of view with respect to a display installed in front of the driver in the vehicle; a video data generating unit configured to clip, when the frequency of the driver's action detected by the frequency detecting unit becomes high, a clipping range in the captured video data acquired by the video acquiring unit wider than a clipping range before the frequency of the driver's action becomes high to generate video data for a predetermined time; and a display controller configured to cause a display installed in front of the driver in the vehicle to display the video data generated by the video data generating unit.

According to one aspect, there is provided a vehicular display control method comprising: acquiring video data captured by a rear camera configured to capture a rear view of a vehicle; detecting a frequency of a driver's action in the vehicle for changing a range of view with respect to a display installed in front of the driver in the vehicle; clipping, when the detected frequency of the driver's action becomes high, a clipping range in the captured video data wider than a clipping range before the detected frequency of the driver's action becomes high to generate video data for a predetermined time; and causing a display installed in front of the driver in the vehicle to display the generated video data.

According to one aspect, there is provided a non-transitory storage medium that stores a program for causing a computer operating as a vehicular display control device to execute: acquiring video data captured by a rear camera configured to capture a rear view of a vehicle; detecting a frequency of a driver's action in the vehicle for changing a range of view with respect to a display installed in front of the driver in the vehicle; clipping, when the detected frequency of the driver's action becomes high, a clipping range in the captured video data wider than a clipping range before the detected frequency of the driver's action becomes high to generate video data for a predetermined time; and causing a display installed in front of the driver in the vehicle to display the generated video data.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 6 is a diagram that illustrates an example of a first clipping-range definition table in the vehicular display system according to the first embodiment.

FIG. 7 is a diagram that illustrates another example of the first clipping-range definition table of the vehicular display system according to the first embodiment.

FIG. 14 is a flowchart that illustrates an example of the flow of the processes by the vehicular display system according to the second embodiment.

FIG. 15 is a block diagram that illustrates an example of the configuration of the vehicular display system according to a third embodiment.

FIG. 16 is a diagram that illustrates an example of a second clipping-range definition table of the vehicular display system according to the third embodiment.

DETAILED DESCRIPTION OF THE PREFERRED EMBODIMENTS

With reference to the attached drawings, a detailed explanation is given below of embodiments of a vehicular display control device 10, a vehicular display system 1, a vehicular display control method, and a non-transitory storage medium according to the present application. Furthermore, the present application is not limited to the embodiments below.

First Embodiment

Figure 1:
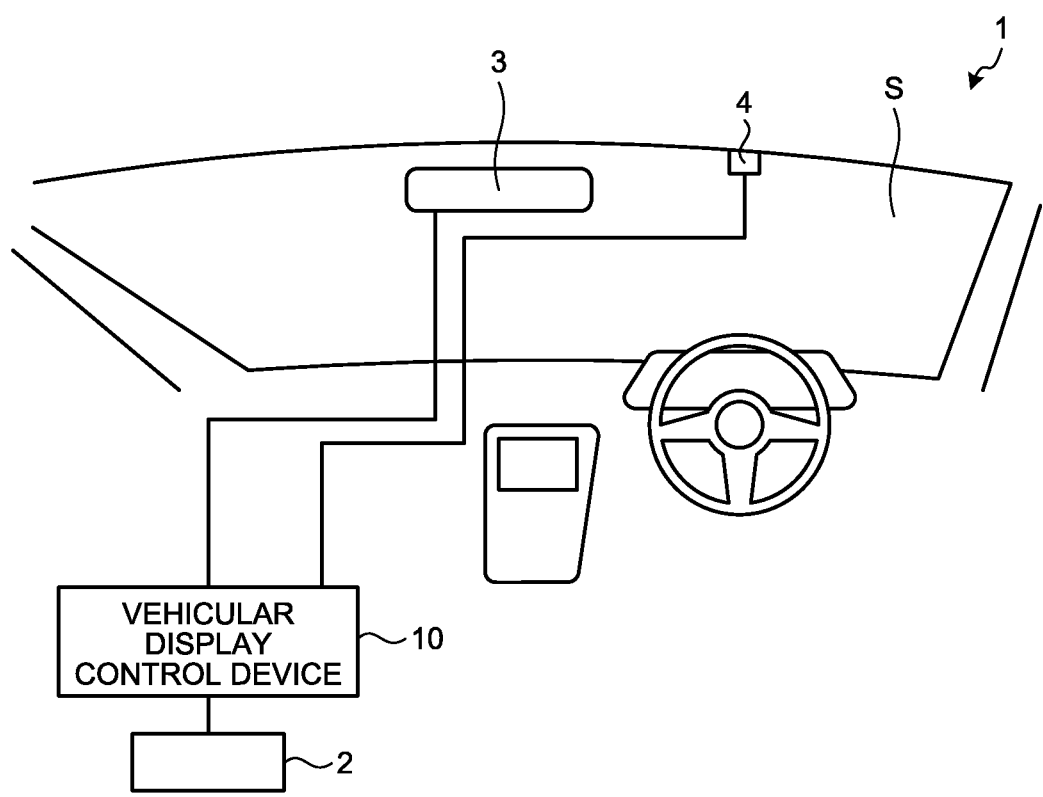
FIG. 1 is a schematic view that illustrates an example of a configuration of a vehicular display system according to a first embodiment.
Figure 2:
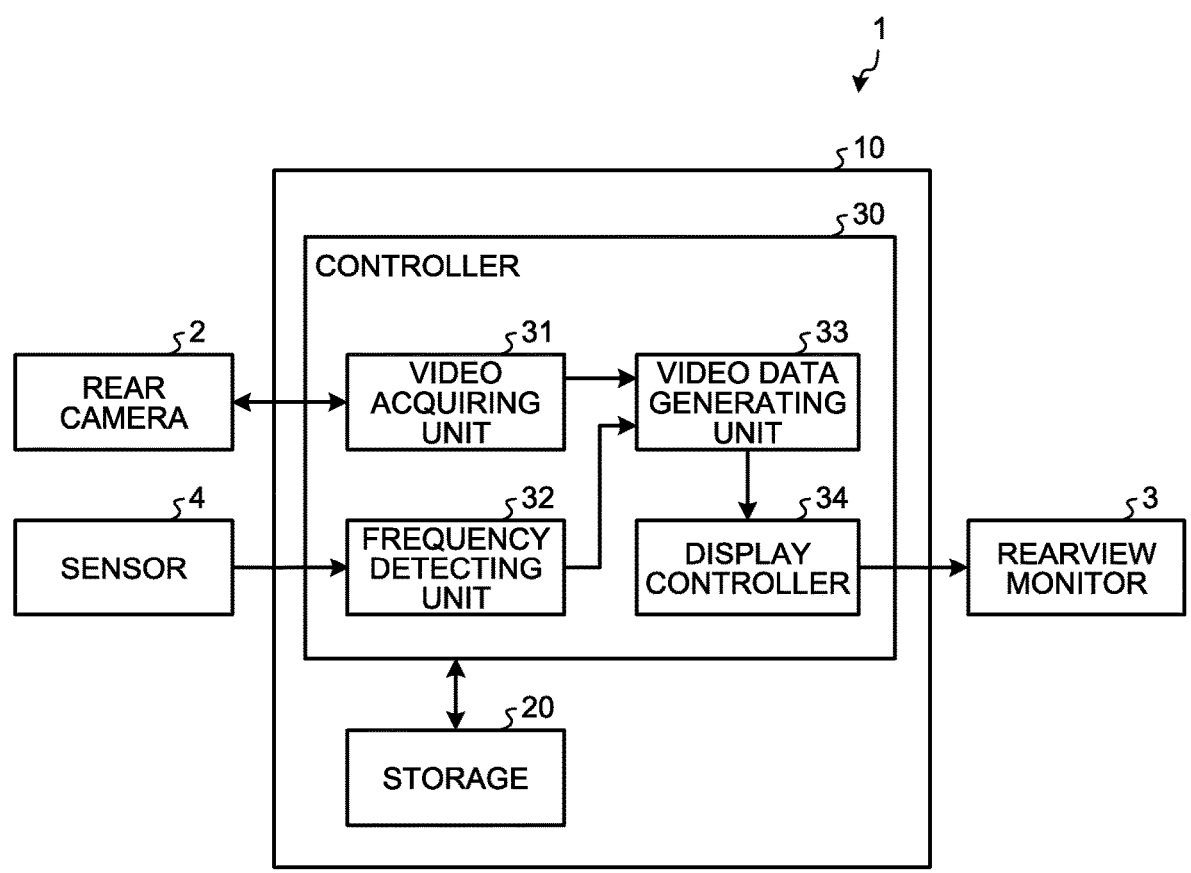
FIG. 2 is a block diagram that illustrates an example of the configuration of the vehicular display system according to the first embodiment.
Figure 3:
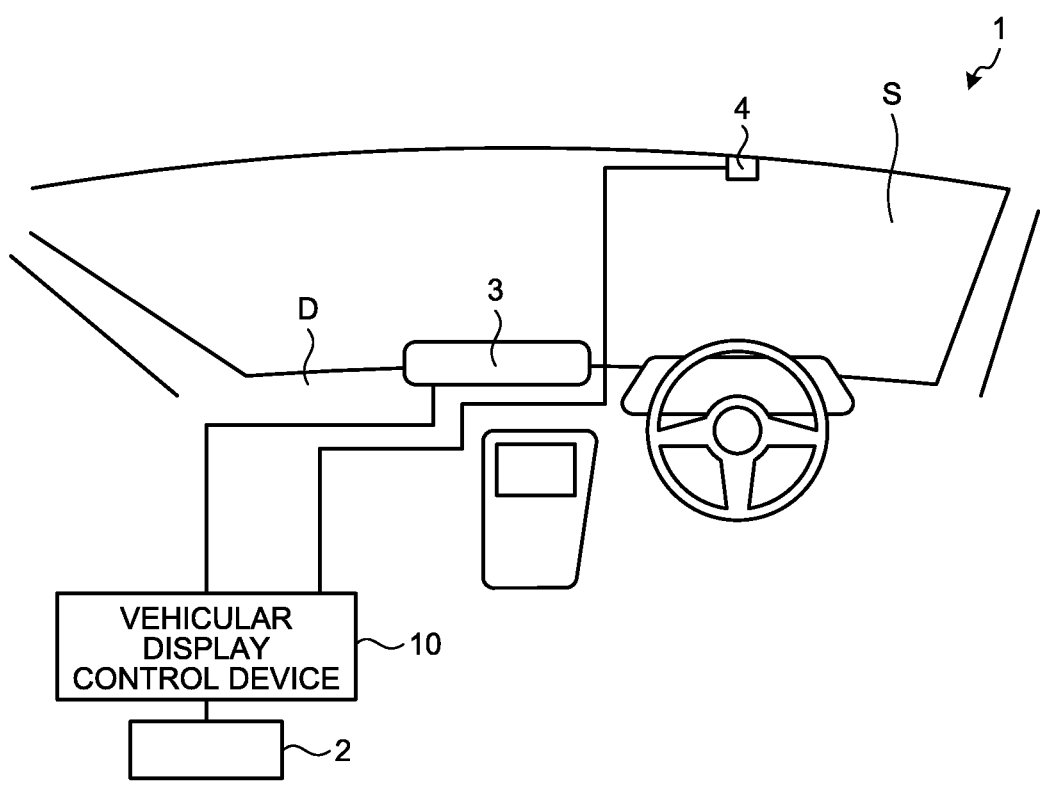
FIG. 3 is a schematic view that illustrates another example of the configuration of the vehicular display system according to the first embodiment.

The vehicular display system 1 is installed in a vehicle, and it displays video of captured rear view of the vehicle. FIG. 1 is a schematic view that illustrates an example of a configuration of the vehicular display system according to a first embodiment. FIG. 2 is a block diagram that illustrates an example of the configuration of the vehicular display system according to the first embodiment. FIG. 3 is a schematic view that illustrates another example of the configuration of the vehicular display system according to the first embodiment.

As illustrated in FIGS. 1 and 3, the vehicular display system 1 includes a rear camera 2, a rearview monitor (display) 3, a sensor (detecting unit) 4, and the vehicular display control device 10. The vehicular display system 1 causes the rearview monitor 3 to display video data 120 that is clipped from captured video data 100, the video data 120 being clipped in a wider range as a frequency of movement of a driver's head is higher. The vehicular display system 1 causes the rearview monitor 3 to display video data 130 that is clipped from the captured video data 100, the video data 130 being clipped in a narrower range as the frequency of the movement of the driver's head is lower.

Figure 4:
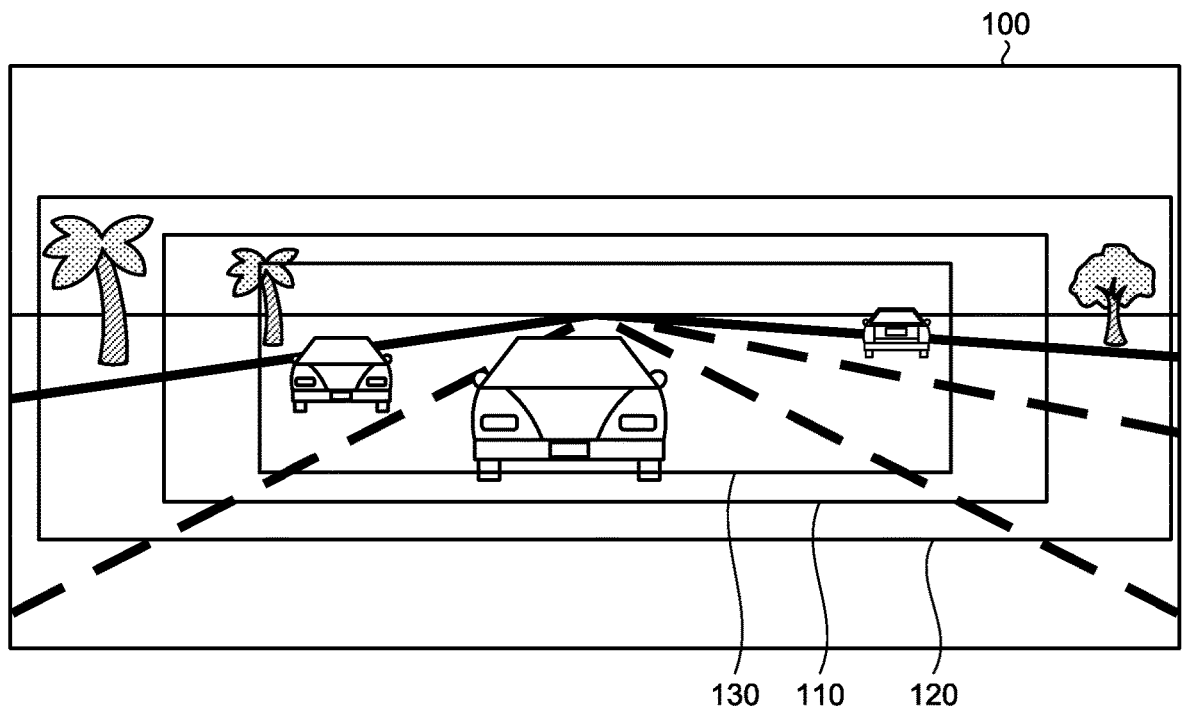
FIG. 4 is a diagram that illustrates an example of video data captured by a rear camera in the vehicular display system according to the first embodiment.

The rear camera 2 is provided in a rear part of the vehicle to capture video data of the rear view of the vehicle. FIG. 4 is a diagram that illustrates an example of the video data captured by the rear camera in the vehicular display system according to the first embodiment. As illustrated in FIG. 4, the rear camera 2 captures the video data for a range including a displayed range of the rearview monitor 3. In other words, the rear camera 2 captures the video data for a range including a non-displayed range of the rearview monitor 3. The rear camera 2 has a horizontal angle of view in a range of, for example, 30 to 60°, and a vertical angle of view in a range of, for example, 5 to 20°. In this way, the rear camera 2 is capable of capturing the video in a wider range than the range displayed in the rearview monitor 3. The video captured by the rear camera 2 is clipped by a video data generating unit 33 of a controller 30 in the vehicular display control device 10 in such a range that the driver of the vehicle may properly recognize the rear view by using the rearview monitor 3, and displayed in the rearview monitor 3. The rear camera 2 outputs the captured video data 100 to a video acquiring unit 31 of the controller 30 in the vehicular display control device 10.

The rearview monitor 3 is an electronic rearview mirror, for example. In a case of using the rearview monitor 3 as an electronic rearview mirror, it does not matter whether or not a half mirror is provided for checking the rear view according to optical reflection. The rearview monitor 3 is, for example, a display including a liquid crystal display (LCD: Liquid Crystal Display), an organic EL (Organic Electro-Luminescence) display, or the like.

The rearview monitor 3 is provided at a position easily viewable by the driver. According to the present embodiment, as illustrated in FIG. 1, the rearview monitor 3 is positioned in an upper part of center in a windshield S in a vehicle width direction in front of the driver. As illustrated in FIG. 3, the rearview monitor 3 may be positioned in an upper part of center in a dashboard D in the vehicle width direction.

Figure 5:
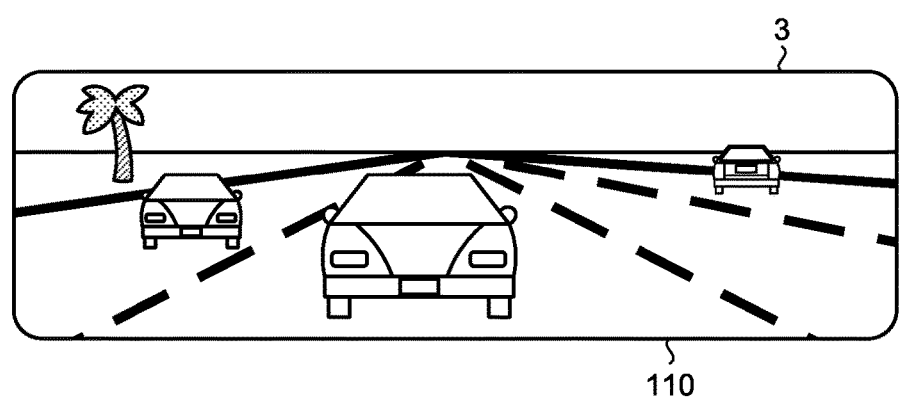
FIG. 5 is a diagram that illustrates an example of the video displayed on a rearview monitor in the vehicular display system according to the first embodiment.

The rearview monitor 3 displays the video of the rear view of the vehicle based on video signals output from a display controller 34 of the controller 30 in the vehicular display control device 10. For example, the rearview monitor 3 displays video data 110 that is rear view video illustrated in FIG. 5. FIG. 5 is a diagram that illustrates an example of the video displayed in the rearview monitor in the vehicular display system according to the first embodiment. The video data 110 illustrated in FIG. 5 is displayed in a normal clipping range, i.e., a range equivalent to a range viewed with a conventional optical rearview mirror.

With reference back to FIG. 1 to FIG. 3, a sensor 4 detects the driver's action to change a range of view with respect to the rearview monitor 3. According to the present embodiment, the sensor 4 detects the driver's head movement with respect to the rearview monitor 3. In other words, the sensor 4 detects the driver's head movement to change the range of view with respect to the installation position of the rearview monitor 3 as if a conventional optical rearview mirror is installed at the installation position of the rearview monitor 3. The sensor 4 is a sensor that detects the movement in a non-contact manner, such as an image sensor (camera), an infrared sensor, an ultrasound sensor, or a temperature sensor. The sensor 4 outputs a detection result to a frequency detecting unit 32.

A range of view of a conventional optical mirror is explained. With the conventional optical mirror, when a driver moves his head with respect to the conventional optical mirror, the range of view becomes wider in a direction opposite to a direction in which the head has moved. More specifically, with the conventional optical mirror, when the driver moves his head in a right direction with respect to the conventional optical mirror, the range of view becomes wider in a left direction. With the conventional optical mirror, when the driver moves his head in the left direction with respect to the conventional optical mirror, the range of view becomes wider in the right direction. With the conventional optical mirror, when the driver moves his head in an upward direction with respect to the conventional optical mirror, the range of view becomes wider in a downward direction. With the conventional optical mirror, when the driver moves his head in the downward direction with respect to the conventional optical mirror, the range of view becomes wider in the upward direction.

With reference back to FIG. 2, the vehicular display control device 10 includes a storage 20 and the controller 30.

The storage 20 stores data required for various types of processing by the vehicular display control device 10 and various processing results. The storage 20 is a storage device, for example, a semiconductor memory device such as a RAM (Random Access Memory), a ROM (Read Only Memory), or a flash memory (Flash Memory), a hard disk, an optical disk, or an external storage device via a network. Alternatively, it may be an external storage device wirelessly connected via a communication device not shown.

A first clipping-range definition table 21 is stored in the storage 20. The first clipping-range definition table 21 defines a clipping range of the captured video data 100 for each frequency of the movement of the driver's head. The first clipping-range definition table 21 defines that a wider range is clipped as the frequency of the movement of the driver's head is higher and a narrower range is clipped as the frequency of the movement of the driver's head is lower. For example, the number of times of the movement of the head per a predetermined time or the accumulated number of the movement of the head is used as the frequency of the movement of the driver's head. When the frequency of the movement of the driver's head is high, it is assumed that the driver is trying to see the view in a range different from a range displayed in the rearview monitor 3. For this reason, when the frequency of the movement of the driver's head is high, the captured video data 100 is clipped in a range wider than the normal clipping range. When the frequency of the movement of the driver's head is low, it is assumed that the driver is not trying to see the view in a range different from the range displayed in the rearview monitor 3. For this reason, when the frequency of the movement of the driver's head is low, the captured video data 100 is clipped in the normal clipping range. When there is no movement of the driver's head, it is assumed that the driver is hardly moving his eyes. Therefore, when there is no movement of the driver's head, the captured video data 100 is clipped in a range narrower than the normal clipping range.

With reference to FIG. 6, the first clipping-range definition table 21 is explained. FIG. 6 is a diagram that illustrates an example of the first clipping-range definition table in the vehicular display system according to the first embodiment. In the first clipping-range definition table 21 illustrated in FIG. 6, the frequency of the movement of the driver's head is defined by the number of times of the movement of the driver's head per a predetermined time. The first clipping-range definition table 21 defines that the clipping range is "narrower" than the normal clipping range when the frequency of the movement of the driver's head is "zero in ten seconds", defines that the clipping range is "normal" when the frequency of the movement of the driver's head is "one or more times and less than twice in ten seconds", and defines that the clipping range is "wider" than the normal clipping range when the frequency of the movement of the driver's head is "two or more times in ten seconds". In the first clipping-range definition table 21 illustrated in FIG. 6, "wider" than the normal clipping range means that, for example, the clipping range is wider than the normal clipping range by approximately 20%. In the first clipping-range definition table 21 illustrated in FIG. 6, "narrower" than the normal clipping range means that, for example, the clipping range is narrower than the normal clipping range by approximately 20%.

With reference to FIG. 7, another example of the first clipping-range definition table 21 is explained. FIG. 7 is a diagram that illustrates another example of the first clipping-range definition table of the vehicular display system according to the first embodiment. In the first clipping-range definition table 21 illustrated in FIG. 7, the frequency of the movement of the head is defined by the accumulated number of times of the movement of the driver's head. The accumulated number of times of the movement of the driver's head is, for example, a count of the movement of the driver's head in a short time interval, approximately several seconds. In other words, when there is no movement of the driver's head for more than several seconds, the counter is reset. The first clipping-range definition table 21 defines that the clipping range is "narrower" than the normal clipping range when the frequency of the movement of the driver's head is "zero as accumulated", defines that the clipping range is "normal" when the frequency of the movement of the driver's head is "one or more times and less than ten times as accumulated", and defines that the clipping range is "wider" than the normal clipping range when the frequency of the movement of the driver's head is "ten or more times as accumulated". In the first clipping-range definition table 21 illustrated in FIG. 7, "wider" than the normal clipping range means that, for example, the clipping range is wider than the normal clipping range by approximately 20%. In the first clipping-range definition table 21 illustrated in FIG. 7, "narrower" than the normal clipping range means that, for example, the clipping range is narrower than the normal clipping range by approximately 20%.

With reference back to FIG. 2, the controller 30 is an arithmetic processing device configured by using, for example, a CPU (Central Processing Unit). The controller 30 includes the video acquiring unit 31, the frequency detecting unit 32, the video data generating unit 33, and the display controller 34. The controller 30 executes commands included in programs that are stored in the storage 20.

The video acquiring unit 31 acquires video of captured rear view of the vehicle. The captured video data 100 acquired by the video acquiring unit 31 is, for example, video data that is a series of images in 60 frames per second. According to the present embodiment, the video acquiring unit 31 acquires the captured video data 100 output from the rear camera 2. The video acquiring unit 31 outputs the captured video data 100 acquired to the video data generating unit 33.

The frequency detecting unit 32 detects the frequency of the driver's action to change the range of view in accordance with a detection result of the sensor 4. According to the present embodiment, the frequency detecting unit 32 detects the frequency of the movement of the driver's head in accordance with a detection result of the sensor 4. The frequency detecting unit 32 outputs a detection result thereof to the video data generating unit 33.

The video data generating unit 33 acquires the captured video data 100 from the rear camera 2 and generates the video data 110, the video data 120, or the video data 130 to be displayed in the rearview monitor 3. More specifically, the video data generating unit 33 clips the range for being displayed in the rearview monitor 3 in the captured video data 100.

When the frequency of the movement of the driver's head is zero, i.e., when the movement of the driver's head is zero or more and less than a predetermined value, the video data generating unit 33 outputs the video data 110 illustrated in FIG. 5, which is clipped in the captured video data 100 in the normal clipping range, to the display controller 34. According to the present embodiment, the video data generating unit 33 clips central part of the captured video data 100 surrounded by a solid line in FIG. 4 as the video data 110 for the normal clipping range. The normal clipping range is previously stored in the storage 20. The video data generating unit 33 outputs the clipped video data 110 to the display controller 34.

Here, the normal clipping range is a viewable range when the driver squarely looks at the conventional optical rearview mirror. The captured video data 100 includes a range that is not viewable when the driver squarely looks at the conventional optical rearview mirror but viewable when the point of view is shifted or the angle thereof is adjusted, and ranges outside thereof.

The video data generating unit 33 clips the captured video data 100 in a wider range as the frequency of the movement of the driver's head detected by the frequency detecting unit 32 is higher to generate the video data 120, and clips it in a narrower range as the frequency of the movement of the driver's head is lower to generate the video data 130. More specifically, the video data generating unit 33 performs the clipping by changing the clipping range of the captured video data 100 in accordance with the frequency of the movement of the driver's head corresponding to the first clipping-range definition table 21, generates the video data 120 or the video data 130, and outputs the video data 120 or the video data 130 to the display controller 34.

Figure 8:
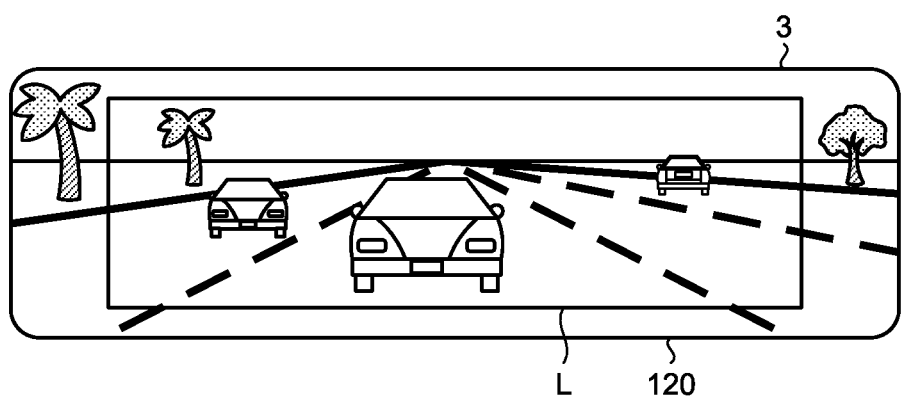
FIG. 8 is a diagram that illustrates another example of the video displayed in the rearview monitor in the vehicular display system according to the first embodiment.

When the frequency of the movement of the driver's head is more than a predetermined value, the video data generating unit 33 outputs the video data 120 illustrated in FIG. 8, which is clipped in a range wider than the normal clipping range in the captured video data 100, to the display controller 34. FIG. 8 is a diagram that illustrates another example of the video displayed in the rearview monitor in the vehicular display system according to the first embodiment. The video data 120 illustrates a border line L indicating the range of view of the video data 110 for the normal clipping range. By seeing the border line L, the driver may easily recognize that the video data 120 displayed in the rearview monitor 3 has a wide range of view as compared with the video data 110.

Figure 9:
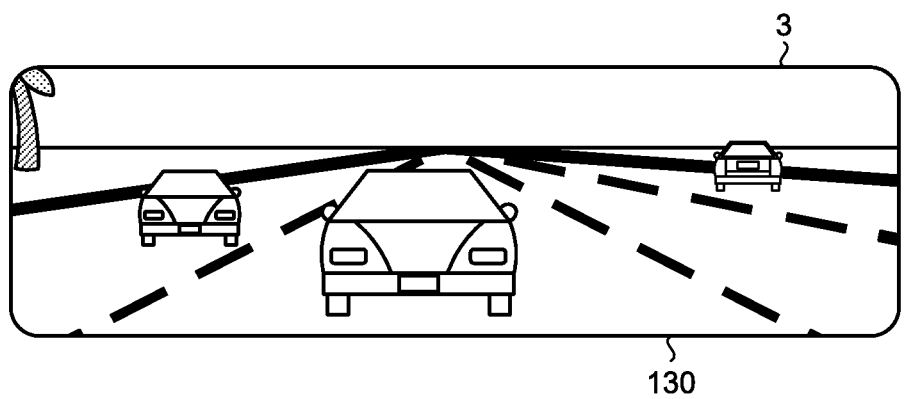
FIG. 9 is a diagram that illustrates another example of the video displayed in the rearview monitor in the vehicular display system according to the first embodiment.

When the frequency of the movement of the driver's head is zero, the video data generating unit 33 outputs the video data 130 illustrated in FIG. 9, which is clipped in a range narrower than the normal clipping range in the captured video data 100, to the display controller 34. FIG. 9 is a diagram that illustrates another example of the video displayed in the rearview monitor in the vehicular display system according to the first embodiment. The video data 130 has a narrower range of view than that of the video data 110, and captured objects are enlarged.

In this way, the video data generating unit 33 generates the video data 110, the video data 120, or the video data 130 by changing the clipping range such that the range required by the driver is included in accordance with the frequency of the movement of the driver's head.

The display controller 34 causes the rearview monitor 3 to display the video data 110, the video data 120, or the video data 130 generated by the video data generating unit 33.

Figure 10:
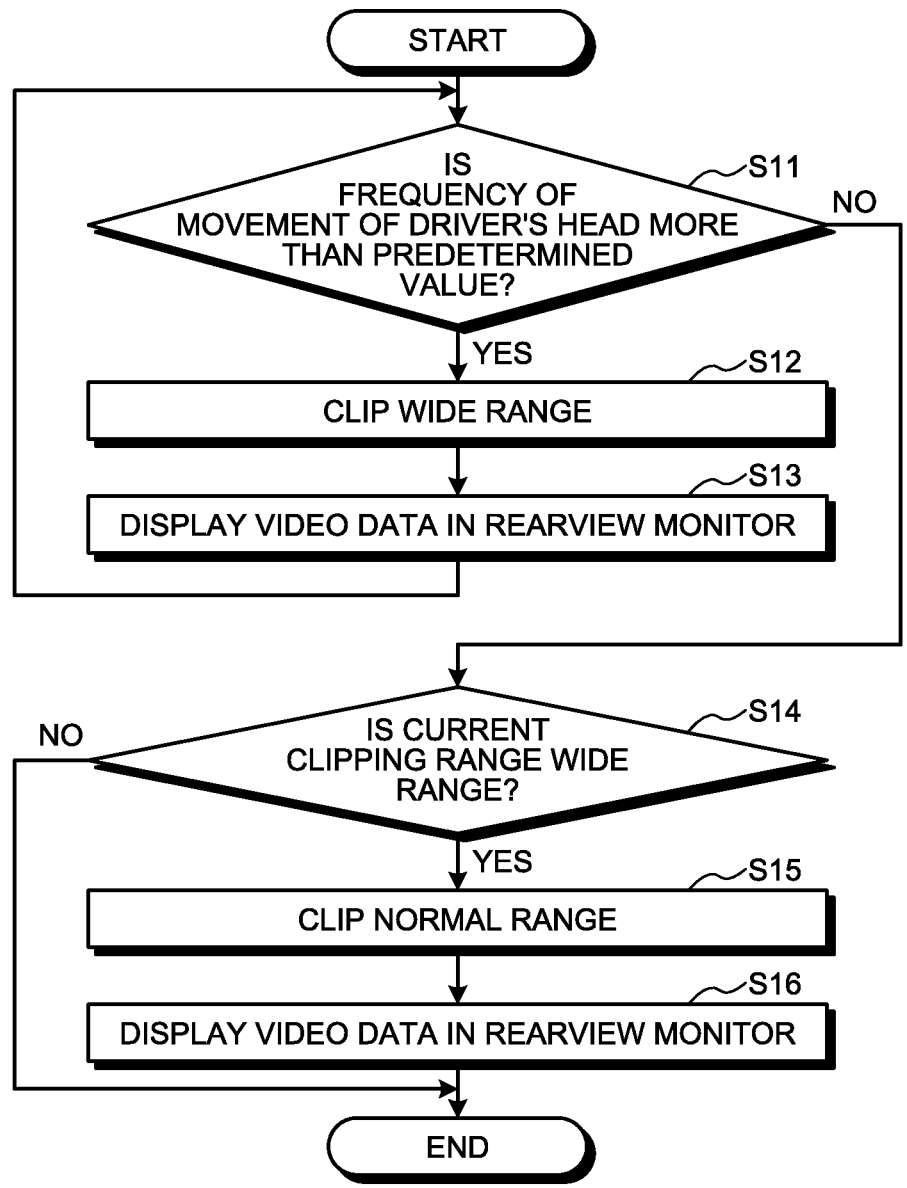
FIG. 10 is a flowchart that illustrates an example of flow of processes in the vehicular display system according to the first embodiment.

Next, with reference to FIG. 10, flow of processes by the controller 30 is explained. FIG. 10 is a flowchart that illustrates an example of the flow of the processes in the vehicular display system according to the first embodiment.

It is assumed in FIG. 10 that the rearview monitor 3 displays the video data 110 while the vehicle is in operation. Furthermore, in this state, the controller 30 continuously acquires the frequency of the movement of the driver's head. More specifically, the controller 30 uses the frequency detecting unit 32 to monitor the frequency of the movement of the driver's head on a constant basis in accordance with a detection result of the sensor 4.

The controller 30 determines whether the frequency of the movement of the driver's head is more than a predetermined value (Step S11). More specifically, the controller 30 determines whether the frequency of the movement of the driver's head detected by the frequency detecting unit 32 is more than the predetermined value. According to the present embodiment, the predetermined value is twice in ten seconds. When it is determined that the frequency of the movement of the driver's head is not more than the predetermined value (No at Step S11), the controller 30 proceeds to Step S14. When it is determined that the frequency of the movement of the driver's head is more than the predetermined value (Yes at Step S11), the controller 30 proceeds to Step S12. In this case, the frequency of the movement of the driver's head is equivalent to two or more times in ten seconds.

The controller 30 clips a wide range (Step S12). More specifically, the controller 30 uses the video data generating unit 33 to generate the video data 120 that is clipped in the captured video data 100 in a range wider than the normal clipping range.

The controller 30 displays the generated video data 120 in the rearview monitor 3 (Step S13). More specifically, the controller 30 uses the display controller 34 to display the video data 120 in the rearview monitor 3.

The controller 30 determines whether the current clipping range is a wide range (Step S14). More specifically, when the current clipping range is a range wider than the normal clipping range (Yes at Step S14), the controller 30 proceeds to Step S15. When the current clipping range is not a range wider than the normal clipping range (No at Step S14), the controller 30 terminates the process.

The controller 30 clips the normal range (Step S15). More specifically, the controller 30 uses the video data generating unit 33 to generate the video data 110 that is clipped in the captured video data 100 for the normal clipping range.

The controller 30 displays the generated video data 110 in the rearview monitor 3 (Step S16). More specifically, the controller 30 uses the display controller 34 to display the video data 110 in the rearview monitor 3.

When the frequency of the movement of the driver's head is high, for example, when the frequency of the movement of the driver's head is two or more times in ten seconds, it is assumed that the driver is trying to see the view in a range different from the range displayed in the rearview monitor 3. Therefore, the controller 30 causes the rearview monitor 3 to display the video data 120 that is clipped in a range wider than the normal clipping range.

For example, when the frequency of the movement of the driver's head is less than twice in ten seconds, it is assumed that the driver is satisfied with the present range of view. Therefore, the controller 30 causes the rearview monitor 3 to display the video data 110 that is clipped in the normal clipping range.

The controller 30 repeats this process in a predetermined interval, e.g., in each frame or in predetermined frames.

The controller 30 may cause the rearview monitor 3 to display the video data 110 clipped in the normal clipping range after the video data 120 clipped in a range wider than the normal clipping range is displayed in the rearview monitor 3, e.g. for 5 seconds.

With a conventional optical rearview mirror, after the driver moves his head to change the range of view and checks the range of view different from the normal range of view, the driver often returns his head to the previous posture in about several seconds. Conversely, when the driver desires to continuously change the range of view, the direction or the angle of the conventional optical rearview mirror is adjusted to obtain the desired range of view. In other words, it is considered that the driver moves his head when the driver desires to change the range of view discontinuously. Therefore, it is preferable that the rearview monitor 3 displays the video data 120 clipped in a range wider than the normal clipping range for approximately five seconds and then the rearview monitor 3 displays the video data 110 clipped in the normal clipping range.

Figure 11:
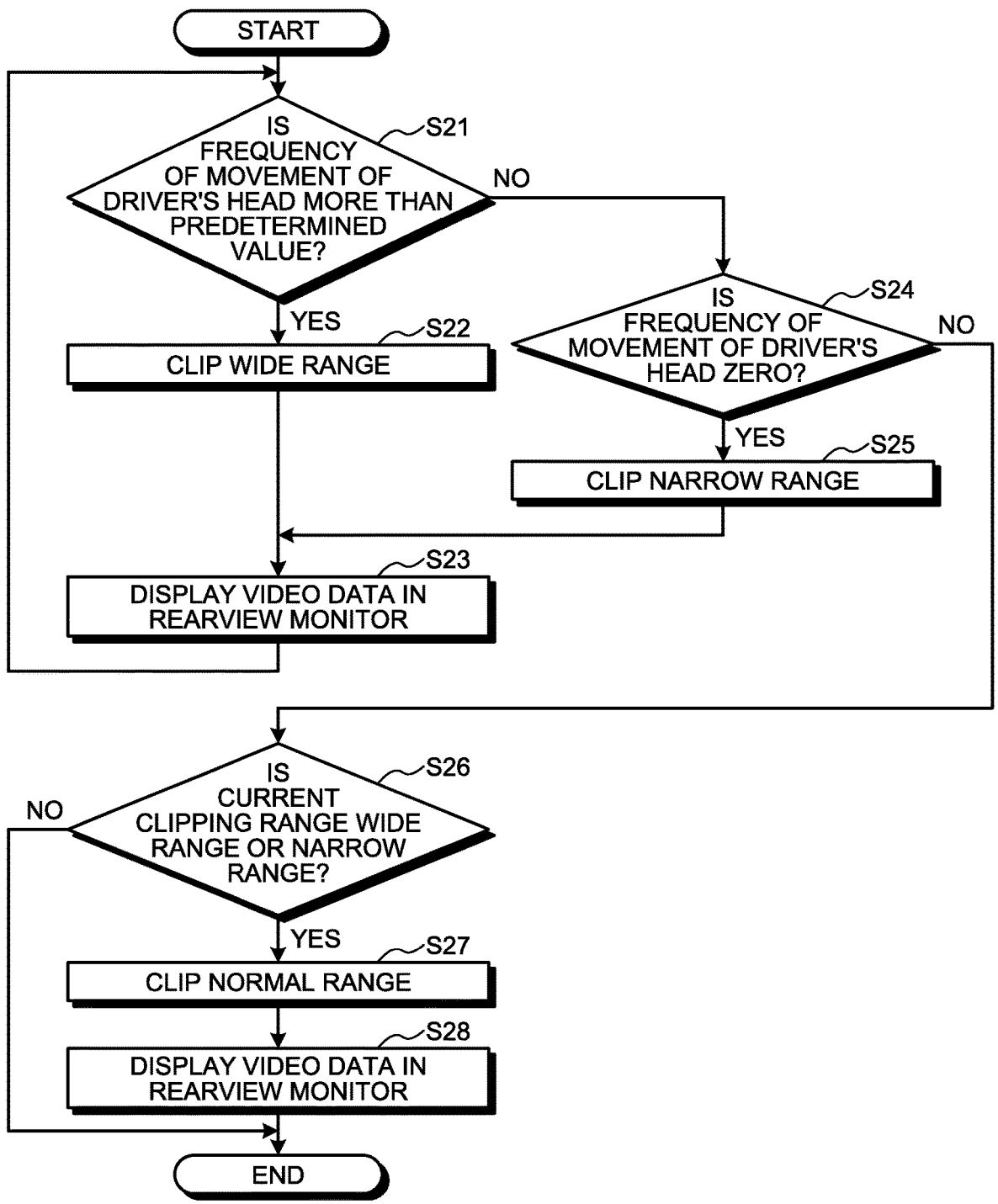
FIG. 11 is a flowchart that illustrates another example of the flow of the processes by the vehicular display system according to the first embodiment.

The flow of the processes by the controller 30 may be processes in accordance with a flowchart illustrated in FIG. 11. FIG. 11 is a flowchart that illustrates another example of the flow of the processes by the vehicular display system according to the first embodiment. The flowchart illustrated in FIG. 11 corresponds to the first clipping-range definition table 21 illustrated in FIG. 6. At Step S21, Step S22, and Step S26 to Step S28, the same processes as those at Step S11, Step S12, and Step S14 to Step S16 in the flowchart illustrated in FIG. 10 are performed.

The controller 30 displays the video data in the rearview monitor 3 (Step S23). More specifically, the controller 30 uses the display controller 34 to display the video data 120 or the video data 130 in the rearview monitor 3.

The controller 30 determines whether the frequency of the movement of the driver's head is zero in ten seconds (Step S24). More specifically, the controller 30 determines whether the frequency of the movement of the driver's head detected by the frequency detecting unit 32 is zero in ten seconds. When it is determined that the frequency of the movement of the driver's head is not zero in ten seconds (No at Step S24), the controller 30 proceeds to Step S26. In this case, the frequency of the movement of the driver's head is equivalent to one or more times and less than twice in ten seconds. When it is determined that the frequency of the movement of the driver's head is zero in ten seconds (Yes at Step S24), the controller 30 proceeds to Step S25. Zero mentioned here is a value smaller than the predetermined value at Step S21, and it includes a state where there is little movement of the head.

The controller 30 clips a narrow range (Step S25). More specifically, the controller 30 uses the video data generating unit 33 to generate the video data 130 that is clipped in the captured video data 100 in a range narrower than the normal clipping range.

When the frequency of the movement of the driver's head is low, for example, when the frequency of the movement of the driver's head is zero in ten seconds, it is assumed that the driver is not moving his eyes. Therefore, the controller 30 causes the rearview monitor 3 to display the video data 130 that is clipped in a range narrower than the normal clipping range.

The flow of the processes by the controller 30 may be processes in accordance with a flowchart that corresponds to the first clipping-range definition table 21 illustrated in FIG. 7.

As described above, according to the present embodiment, when the frequency of the movement of the driver's head is more than a predetermined value, the rearview monitor 3 displays the video data 120 clipped in a range wider than the normal clipping range. According to the present embodiment, when the frequency of the movement of the driver's head is zero, the rearview monitor 3 displays the video data 130 that is clipped in a range narrower than the normal clipping range. According to the present embodiment, when the frequency of the movement of the driver's head is zero or more times and less than the predetermined value, the rearview monitor 3 displays the video data 110 that is clipped in the normal clipping range. In this way, according to the present embodiment, appropriate and required information for the driver may be displayed in accordance with the frequency of the unconscious movement of the driver's head. Thus, according to the present embodiment, the driver may appropriately check the surroundings of the vehicle.

The driver who used to use a conventional optical rearview mirror may move his head unconsciously for changing the range of view so as to obtain necessary information. Therefore, according to the present embodiment, the unconscious movement of the driver's head with respect to the installation position of the rearview monitor 3 for changing the range of view as if a conventional optical mirror is installed at the installation position of the rearview monitor 3 is detected. According to the present embodiment, the rearview monitor 3 is capable of displaying the video data 110, the video data 120, or the video data 130 in accordance with the frequency of the unconscious movement of the head for changing the range of view by the driver for a conventional optical rearview mirror.

According to the present embodiment, when the frequency of the movement of the driver's head is high, e.g., during driving in a city, the rearview monitor 3 is capable of displaying the rear view of the vehicle in a wider range.

According to the present embodiment, when the frequency of the movement of the driver's head is low, e.g., during driving on an express way, the rearview monitor 3 is capable of displaying the rear view of the vehicle in a narrow range in an enlarged manner. Thus, according to the present embodiment, for example, when the frequency of the movement of the driver's head is low, the inter-vehicular distance with a vehicle behind may be easily recognized. Furthermore, for example, when the frequency of the movement of the driver's head is low, a vehicle behind in a long distance may be easily recognized.

According to the present embodiment, when the frequency of the movement of the driver's head is more than a predetermined value, the rearview monitor 3 displays the video data 120 clipped in a range wider than the normal clipping range. Then, for example, after a lapse of five seconds, the rearview monitor 3 may display the video data 110 clipped in the normal clipping range. Therefore, according to the present embodiment, an amount of information displayed in the rearview monitor 3 may be increased only when the driver takes action to change the range of view. Thus, according to the present embodiment, the video data 120 with an increased amount of information is displayed in the rearview monitor 3 with limited timings to suppress an amount of time for checking the rear view in the rearview monitor 3 by the driver.

Second Embodiment

Figure 12:
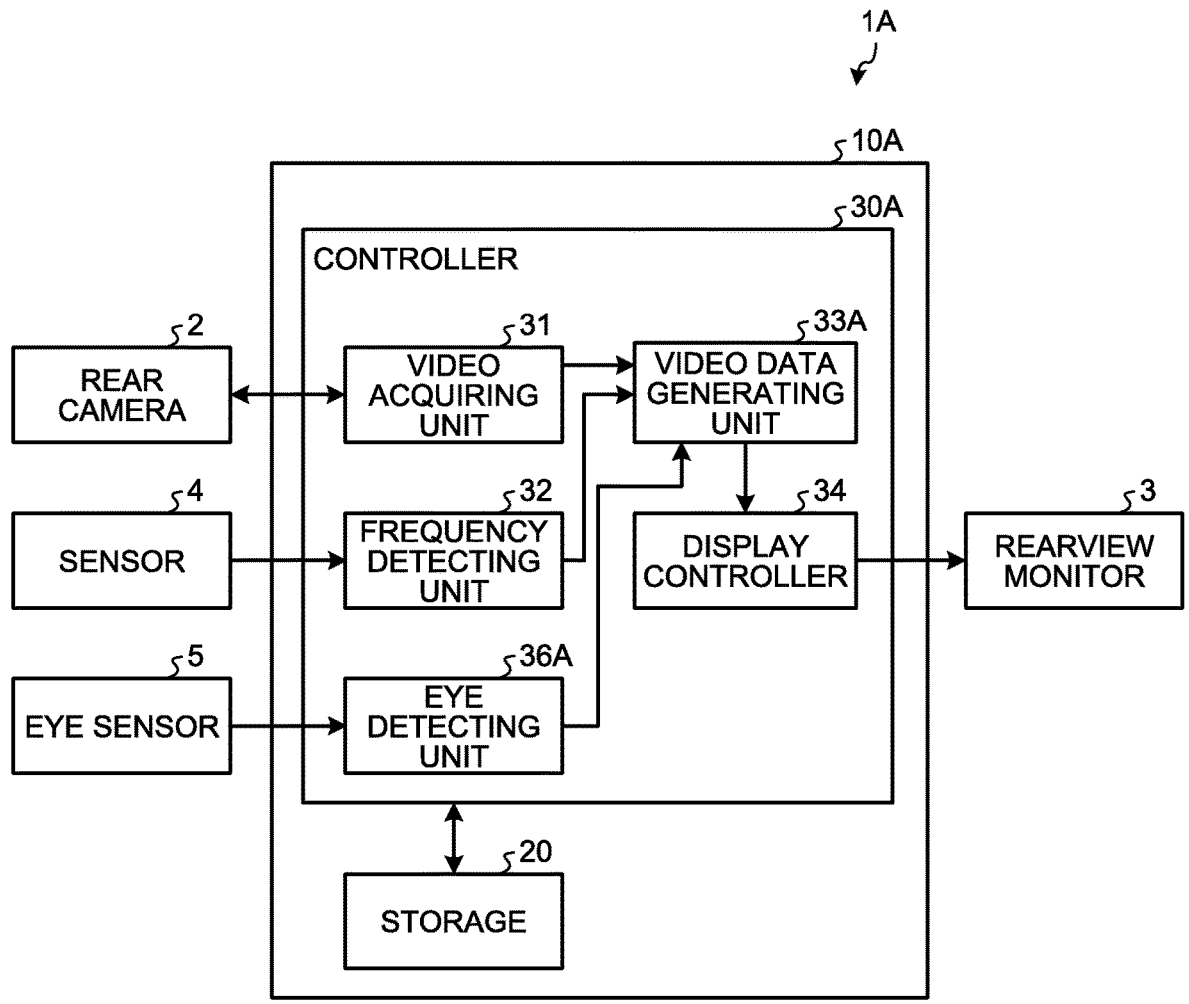
FIG. 12 is a block diagram that illustrates an example of the configuration of the vehicular display system according to a second embodiment.
Figure 13:
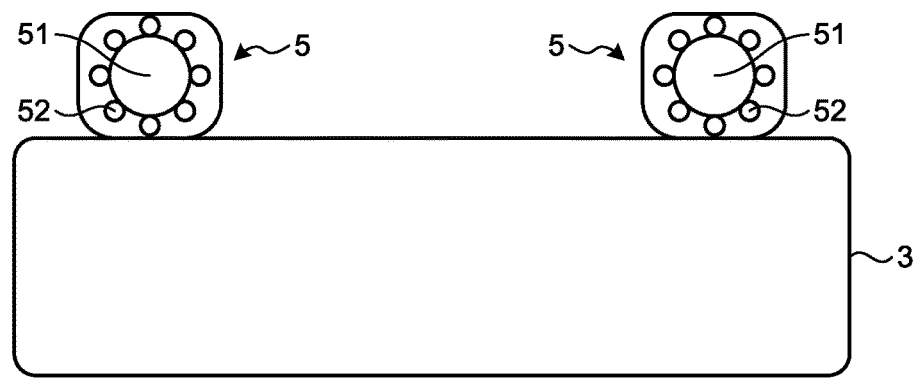
FIG. 13 is a schematic view that illustrates eye sensors and the rearview monitor in the vehicular display system according to the second embodiment.

With reference to FIG. 12 to FIG. 14, a vehicular display system 1A according to the present embodiment is explained. FIG. 12 is a block diagram that illustrates an example of the configuration of the vehicular display system according to a second embodiment. FIG. 13 is a schematic view that illustrates eye sensors and the rearview monitor in the vehicular display system according to the second embodiment. FIG. 14 is a flowchart that illustrates an example of the flow of the processes by the vehicular display system according to the second embodiment.

As illustrated in FIG. 12, the basic configuration of the vehicular display system 1A is the same as that of the vehicular display system 1 according to the first embodiment. In the following explanation, detailed explanation is omitted for the same components as those in the vehicular display system 1. The vehicular display system 1A is different from the vehicular display system 1 according to the first embodiment in that it includes an eye sensor 5 and a vehicular display control device 10A includes an eye detecting unit 36A. The vehicular display system 1A is different from the vehicular display system 1 according to the first embodiment in a process of a controller 30A.

The vehicular display system 1A includes the rear camera 2, the rearview monitor 3, the sensor 4, the eye sensor 5, and the vehicular display control device 10A.

With reference to FIG. 13, the eye sensor 5 is explained. The eye sensor 5 detects line of sight of a driver. The eye sensor 5 is provided near the rearview monitor 3 such that it is faced to the driver's seat. According to the present embodiment, the eye sensor 5 is provided one the rearview monitor 3. For example, the eye sensor 5 includes a pair of infrared cameras 51 and a pair of infrared-light emitting units 52 comprising multiple infrared LEDs. According to the present embodiment, in the eye sensor 5, the infrared-light emitting units 52 emit infrared light toward the driver's face and the infrared cameras 51 capture an image of the driver's eyes. Based on positions of corneal reflexes and pupils of the driver's eyes in the captured video by the infrared cameras 51 as described above, it may be determined whether the driver's eyes turn to the rearview monitor 3. The eye sensor 5 may have a different configuration having the same functionality. The eye sensor 5 outputs a detection result to the eye detecting unit 36A.

In accordance with the detection result of the eye sensor 5, the eye detecting unit 36A detects whether the driver's eyes turn to the rearview monitor 3. More specifically, the eye detecting unit 36A detects the positions of corneal reflexes and pupils of the driver in the captured video by the infrared cameras 51 and determines whether the driver's eyes turn to the rearview monitor 3. The eye detecting unit 36A outputs a detection result to the video data generating unit 33.

Next, with reference to FIG. 14, the flow of the processes by the controller 30A is explained. At Step S32 to Step S34 and Step S35 to Step S37, the same processes as those at Step S11 to Step S13 and Step S14 to Step S16 according to the first embodiment are performed.

The controller 30 determines whether the driver's eyes turn to the rearview monitor 3 (Step S31). More specifically, based on the detection result of the eye detecting unit 36A, the controller 30 determines whether the driver's eyes turn to the rearview monitor 3. When it is determined that the driver's eyes do not turn to the rearview monitor 3 (No at Step S31), the controller 30 proceeds to Step S35. When it is determined that the driver's eyes turn to the rearview monitor 3 (Yes at Step S31), the controller 30 proceeds to Step S32.

As described above, according to the present embodiment, when the driver's eyes turn to the rearview monitor 3 and the frequency of the movement of the driver's head is more than a predetermined value, the rearview monitor 3 may display the video data 120 that is clipped in a wide range. Thus, according to the present embodiment, the rearview monitor 3 may display the video data 120 that is clipped in a wide range only when the driver looks at the rearview monitor 3.

Third Embodiment

Figure 17:
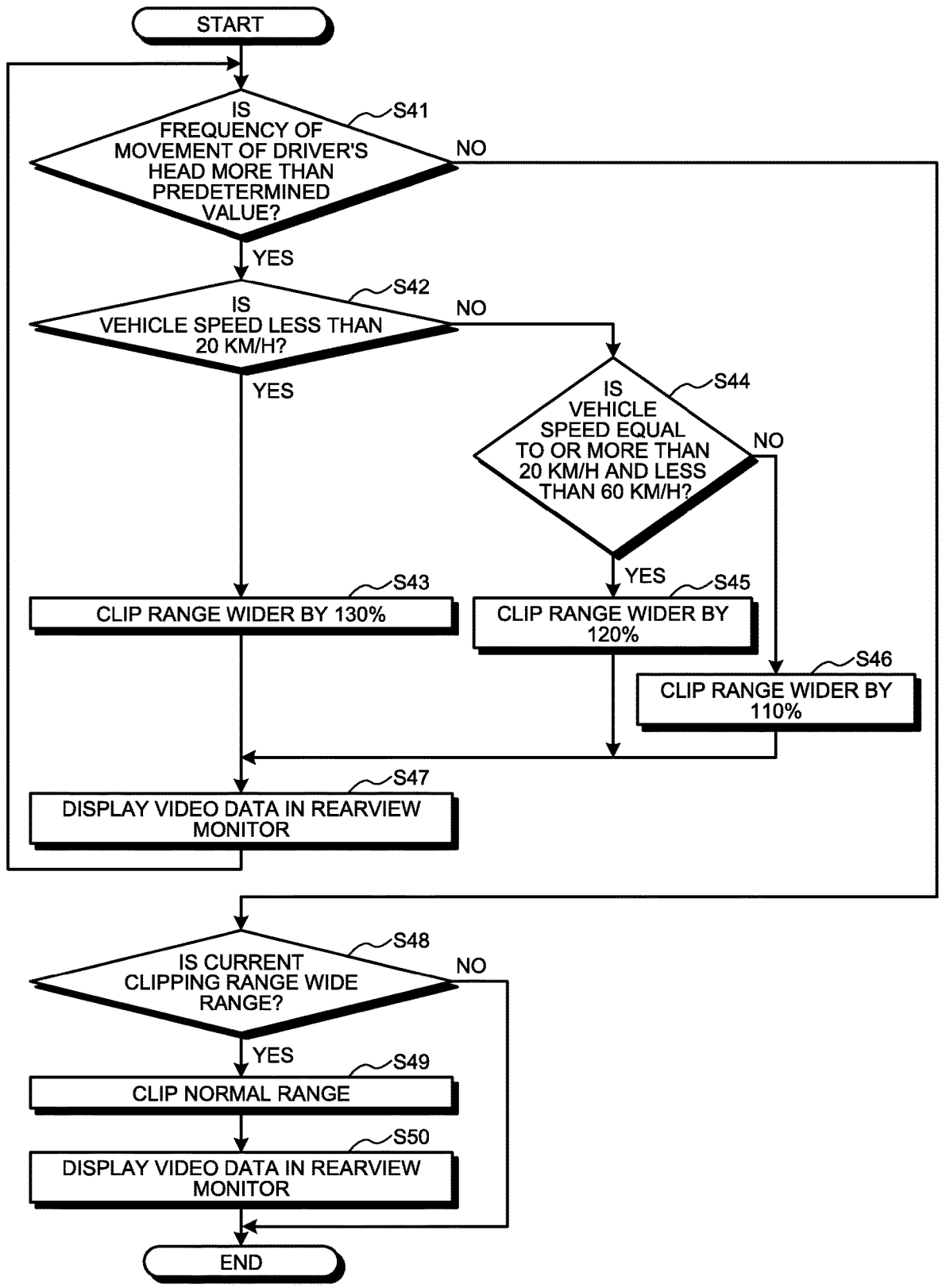
FIG. 17 is a flowchart that illustrates an example of the flow of the processes by the vehicular display system according to the third embodiment.
Figure 18:
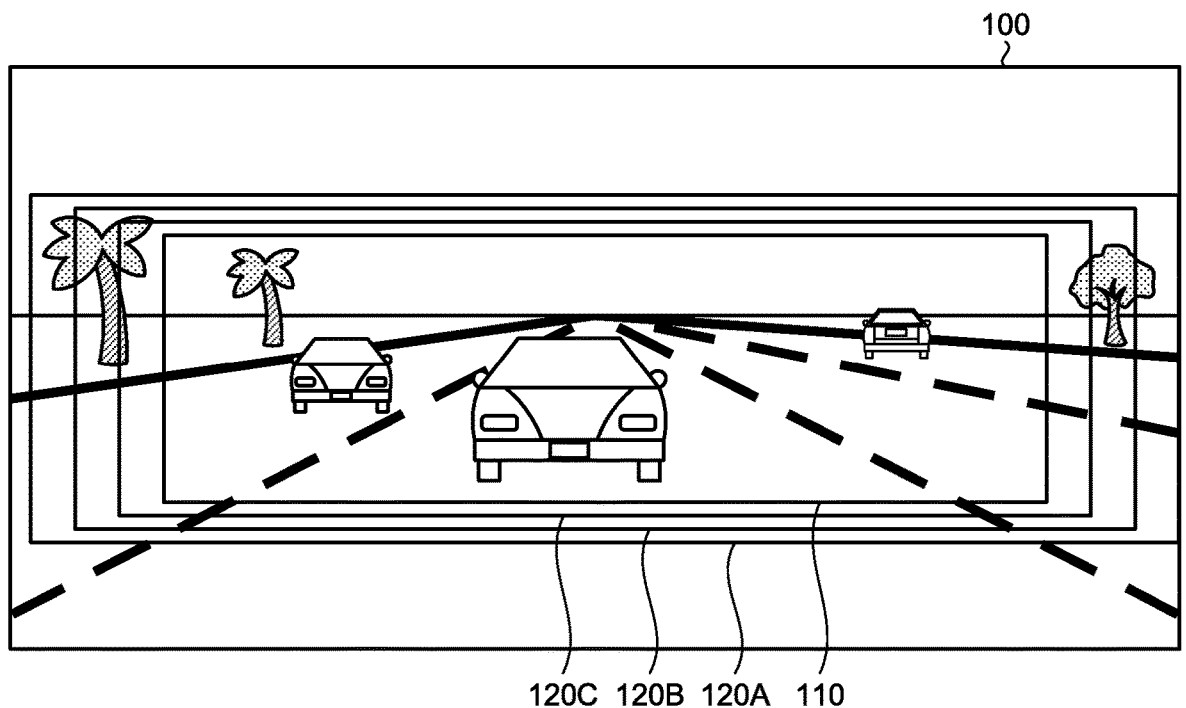
FIG. 18 is a diagram that illustrates an example of the video data that is captured by the rear camera in the vehicular display system according to the third embodiment.
Figure 19:
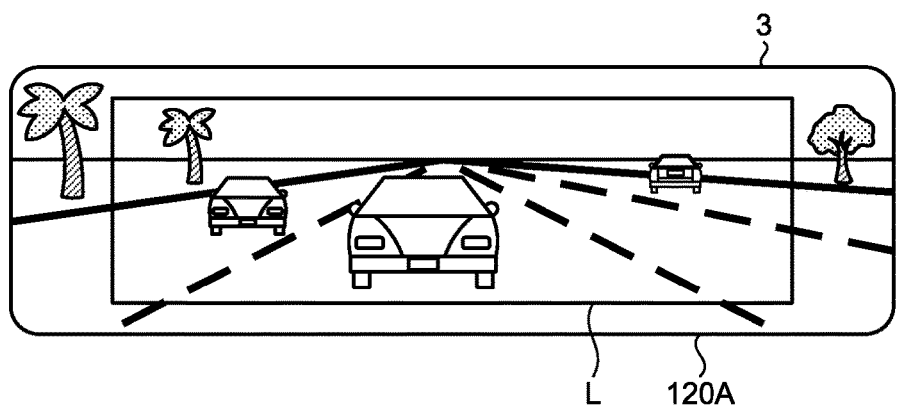
FIG. 19 is a diagram that illustrates an example of the video displayed in the rearview monitor in the vehicular display system according to the third embodiment.

With reference to FIG. 15 to FIG. 19, a vehicular display system 1B according to the present embodiment is explained. FIG. 15 is a block diagram that illustrates an example of the configuration of the vehicular display system according to a third embodiment. FIG. 16 is a diagram that illustrates an example of a second clipping-range definition table of the vehicular display system according to the third embodiment. FIG. 17 is a flowchart that illustrates an example of the flow of the processes by the vehicular display system according to the third embodiment. FIG. 18 is a diagram that illustrates an example of the video data that is captured by the rear camera in the vehicular display system according to the third embodiment. FIG. 19 is a diagram that illustrates an example of the video displayed in the rearview monitor in the vehicular display system according to the third embodiment.

As illustrated in FIG. 15, the basic configuration of the vehicular display system 1B is the same as that of the vehicular display system 1 according to the first embodiment. In the vehicular display system 1B, a vehicular display control device 10B is different from the vehicular display control device 10 according to the first embodiment in that it includes a vehicle-speed acquiring unit 35B. The vehicular display system 1B is different from the vehicular display system 1 according to the first embodiment in a process of a controller 30B.

A second clipping-range definition table 22 is stored in the storage 20. The second clipping-range definition table 22 defines the clipping range of the captured video data 100 for each vehicle speed. The second clipping-range definition table 22 defines that a wider range is clipped as a vehicle speed is lower.

With reference to FIG. 16, an example of the second clipping-range definition table 22 according to the present embodiment is explained. The second clipping-range definition table 22 defines that the clipping range is "wider by 130%" than the normal clipping range when the vehicle speed is "less than 20 km/h", defines that the clipping range is "wider by 120%" than the normal clipping range when the vehicle speed is "equal to or more than 20 km/h and less than 60 km/h", and defines that the clipping range is "wider by 110%" than the normal clipping range when the vehicle speed is "equal to or more than 60 km/h".

A video data generating unit 33B clips, in the captured video data 100, the clipping range for the case in which the frequency of the movement of the head detected by the frequency detecting unit 32 is high wider, as the vehicle speed acquired by the vehicle-speed acquiring unit 35B is lower.

As the vehicle speed is lower, it is assumed that, for example, there are a large number of other vehicles and pedestrians in surrounding areas and the driver desires to ensure the range of view wider than the current range. Therefore, the video data generating unit 33B in the controller 30 clips the captured video data 100 in a wider range as the vehicle speed is lower. When the vehicle speed is low, the driver can check the rear view appropriately in the rearview monitor 3 in which the wide range is displayed.

The vehicle-speed acquiring unit 35B is connected to a CAN (Controller Area Network) included in a vehicle to acquire OBD (On Board Diagnosis) II data, or the like, thereby acquiring vehicle speed information. The vehicle-speed acquiring unit 35B outputs the acquired vehicle speed information to the video data generating unit 33B.

Next, with reference to FIG. 17, the flow of the processes by the controller 30B is explained. At Step S41 and Step S48 to Step S50, the same processes as those at Step S11 and Step S14 to Step S16 according to the first embodiment are performed.

The controller 30B determines whether the vehicle speed is less than 20 km/h (Step S42). When it is determined that the vehicle speed is less than 20 km/h (Yes at Step S42), the controller 30B proceeds to Step S43. When it is determined that the vehicle speed is not less than 20 km/h (No at Step S42), the controller 30B proceeds to Step S44.

The controller 30B clips a range that is wider by 130% (Step S43). More specifically, the controller 30B uses the video data generating unit 33B to generate video data 120A that is clipped in the captured video data 100 in a range wider than the normal clipping range by 130%.

The controller 30B determines whether the vehicle speed is equal to or more than 20 km/h and less than 60 km/h (Step S44). When it is determined that the vehicle speed is equal to or more than 20 km/h and less than 60 km/h (Yes at Step S44), the controller 30B proceeds to Step S45. When it is determined that the vehicle speed is not equal to or more than 20 km/h and less than 60 km/h (No at Step S44), the controller 30B proceeds to Step S46.

The controller 30B clips a range that is wider by 120% (Step S45). More specifically, the controller 30B uses the video data generating unit 33B to generate video data 120B that is clipped in the captured video data 100 in a range wider than the normal clipping range by 120%.

The controller 30B clips a range that is wider by 110% (Step S46). More specifically, the controller 30B uses the video data generating unit 33B to generate video data 120C that is clipped in the captured video data 100 in a range wider than the normal clipping range by 110%.

The controller 30B display the video data in the rearview monitor 3 (Step S47). More specifically, the controller 30 uses the display controller 34 to display the video data 120A, the video data 120B, or the video data 120C in the rearview monitor 3.

For example, when the frequency of the movement of the driver's head is two or more times in ten seconds, it is assumed that the driver desires to ensure the range of view wider than the current range. Furthermore, when the vehicle speed is less than 20 km/h, the controller 30B causes the rearview monitor 3 to display the video data 120A illustrated in FIG. 19, which is clipped in a range wider than the normal clipping range by 130% in the captured video data 100 illustrated in FIG. 18. When the vehicle speed is equal to or more than 20 km/h and less than 60 km/h, the controller 30B causes the rearview monitor 3 to display the video data 120B that is clipped in a range wider than the normal clipping range by 120% in the captured video data 100 illustrated in FIG. 18. When the vehicle speed is equal to or more than 60 km/h, the controller 30B causes the rearview monitor 3 to display the video data 120C that is clipped in a range wider than the normal clipping range by 110% in the captured video data 100 illustrated in FIG. 18.

For example, when the frequency of the movement of the driver's head is less than twice in ten seconds, it is assumed that the driver is satisfied with the current range of view. Therefore, the controller 30B causes the rearview monitor 3 to display the video data 110 that is clipped in the captured video data 100 illustrated in FIG. 18 in the normal clipping range.

As described above, according to the present embodiment, when the frequency of the movement of the driver's head is more than a predetermined value, the rearview monitor 3 displays the video data 120A, the video data 120B, or the video data 120C that is clipped in a wider range as the vehicle speed is lower. In this way, according to the present embodiment, information may be displayed with the appropriate range for the driver in accordance with the vehicle speed. Thus, according to the present embodiment, the driver is capable of checking the surrounding areas of the vehicle appropriately.

Fourth Embodiment

Figure 20:
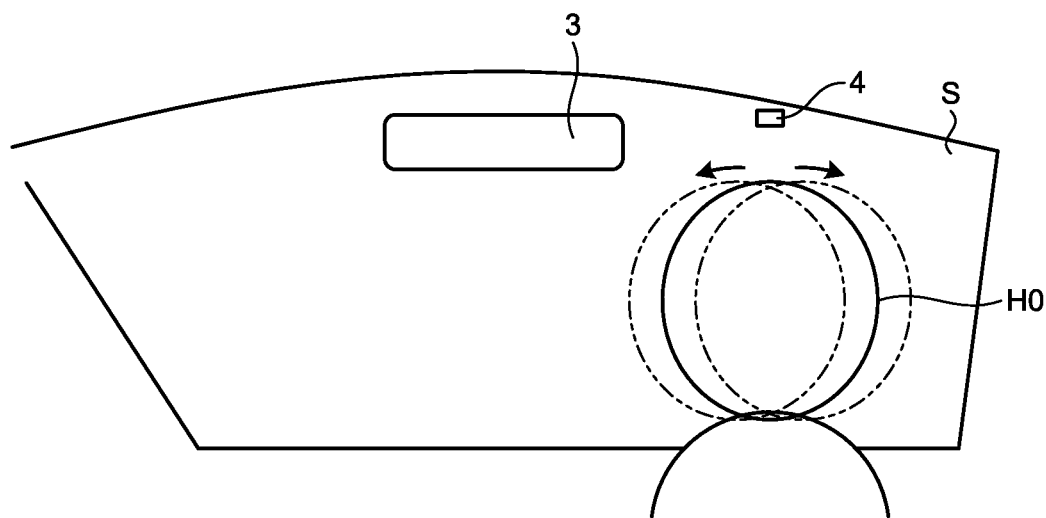
FIG. 20 is a schematic view that illustrates movements of a driver's head detected by the vehicular display system according to a fourth embodiment.

With reference to FIG. 20, the vehicular display system 1 according to the present embodiment is explained. FIG. 20 is a schematic view that illustrates the movement of the driver's head detected by the vehicular display system according to the fourth embodiment. The vehicular display system 1 is different from the first embodiment in that the frequency detecting unit 32 detects the movement of the driver's head to the right or to the left (in a right-and-left direction).

The frequency detecting unit 32 detects the frequency of the movement of the driver's head in a right direction or in a left direction. A reference position HO with little movement is set as a position of the driver's head, and a movement of an intermediate position between the eyes of the driver in a right direction with the reference position HO as a center is referred to as a rightward movement, and a movement thereof in a left direction is referred to as a leftward movement.

Setting of the reference position HO is explained. For example, as for the reference position HO, the position with little movement of the head may be specified as the reference position HO based on a detection result of the movement of the driver's head by the sensor 4. Alternatively, for example, the reference position HO may be calculated based on the position of the driver's seat, the posture of the driver, and the position of the rearview monitor 3.

The sensor 4 detects the movement of the driver's head in a right-and-left direction.

The frequency detecting unit 32 detects the frequency of the movement of the driver's head in a right-and-left direction based on the detection results of the sensor 4.

The video data generating unit 33 generates the video data 110, the video data 120, or the video data 130 by changing the clipping range such that it includes the required range for the driver based on the frequency of the movement of the driver's head in a right-and-left direction, detected by the frequency detecting unit 32.

As described above, according to the present embodiment, as the movement of the driver's head in a right-and-left direction are detected, driver's action to change the range of view is detectable more accurately. According to the present embodiment, it is possible to avoid switching of the video displayed in the rearview monitor 3 due to an action different from the action for changing the range of view by the driver. In this manner, according to the present embodiment, more appropriate and required information for the driver may be displayed based on the frequency of the movement of the driver's head in a right-and-left direction. Thus, according to the present embodiment, the driver is capable of checking the surrounding areas of the vehicle more appropriately.

Fifth Embodiment

Figure 21:
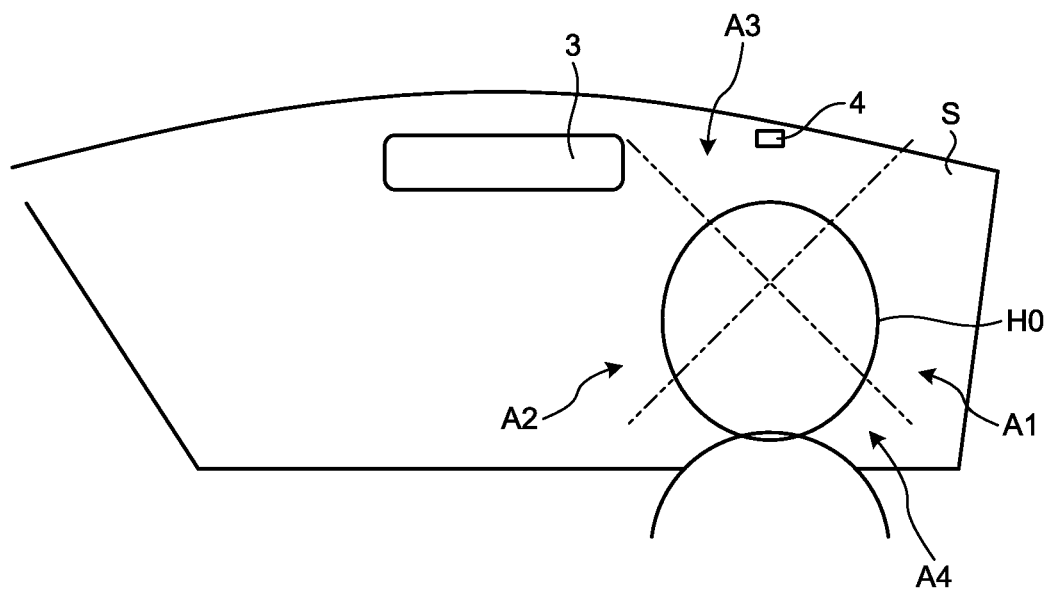
FIG. 21 is a schematic view that illustrates the movement of the driver's head detected by the vehicular display system according to a fifth embodiment.
Figure 22:
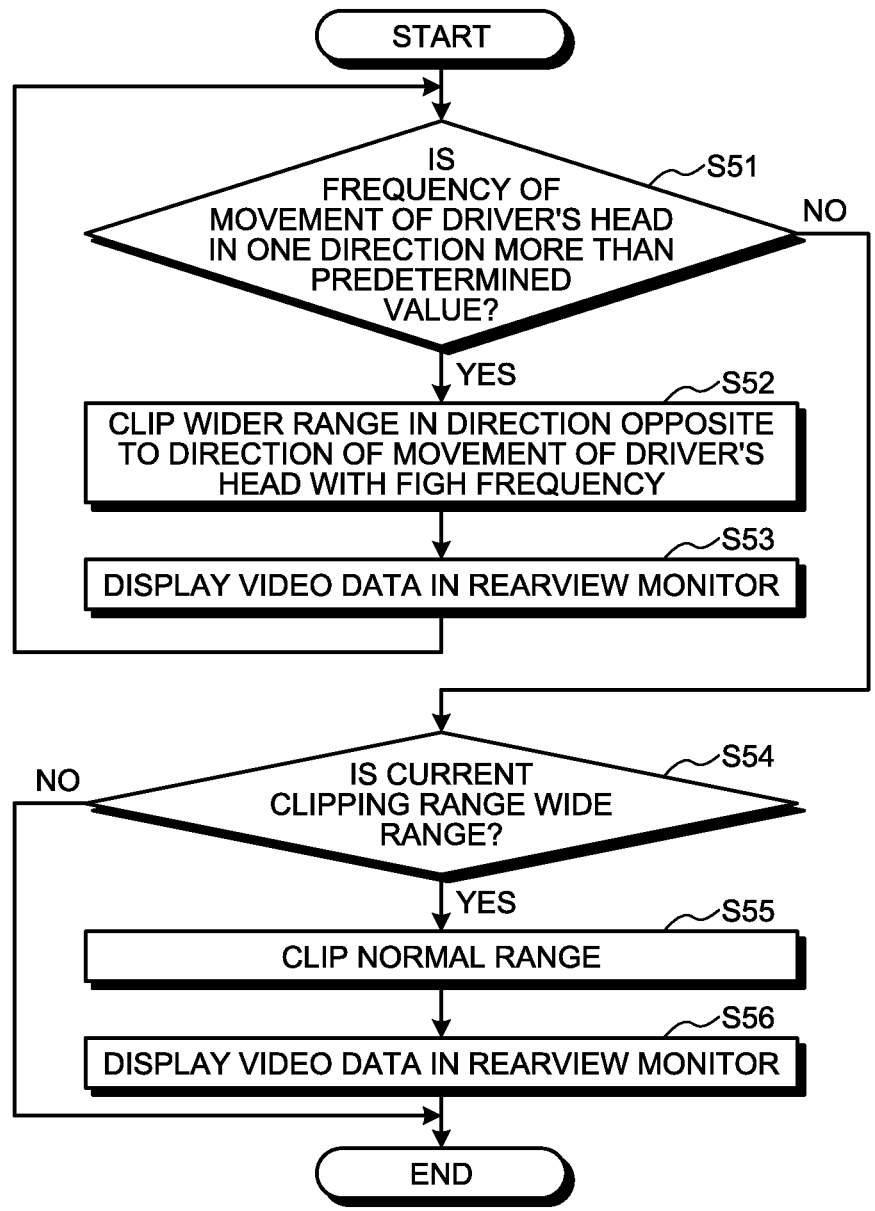
FIG. 22 is a flowchart that illustrates an example of the flow of the processes of the vehicular display system according to the fifth embodiment.
Figure 23:
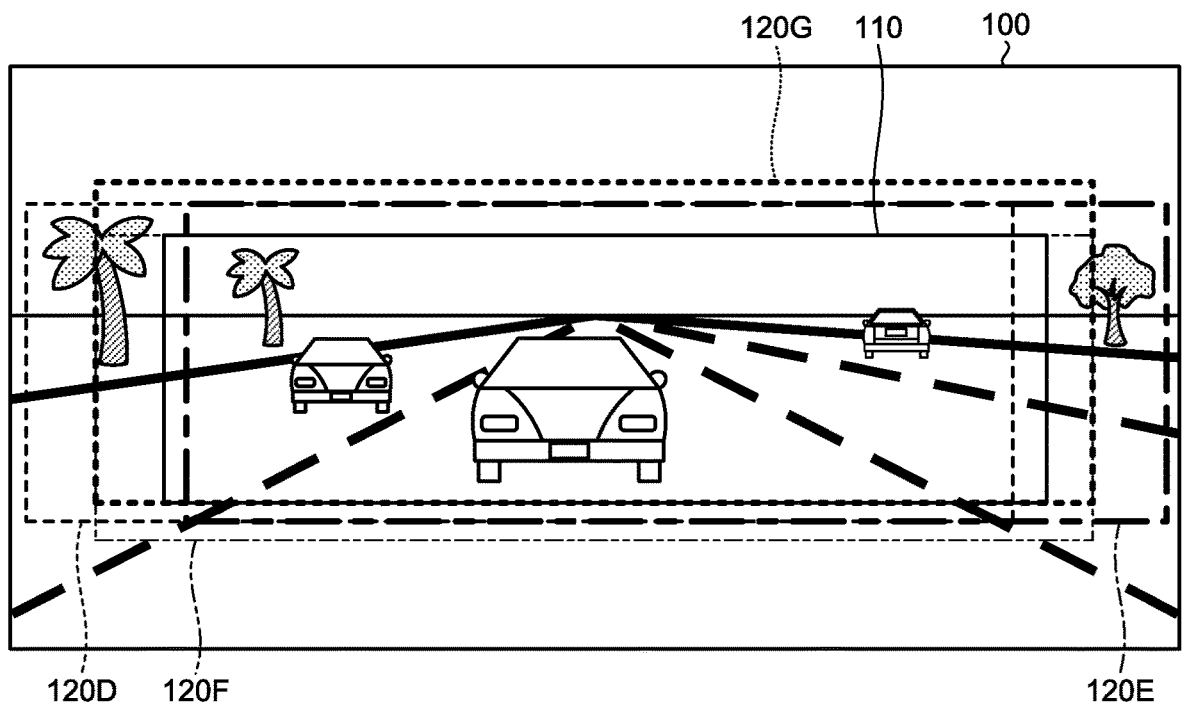
FIG. 23 is a diagram that illustrates an example of the video data captured by the rear camera in the vehicular display system according to the fifth embodiment.
Figure 24:
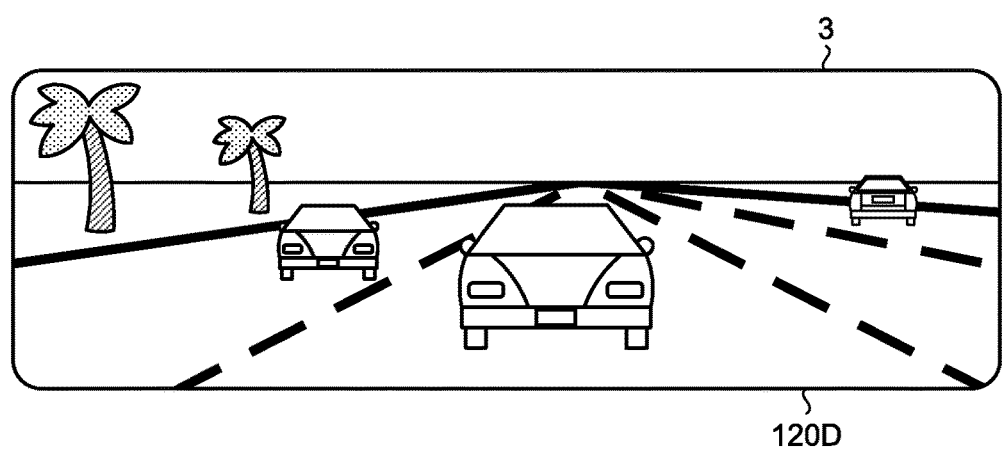
FIG. 24 is a diagram that illustrates an example of the video displayed in the rearview monitor in the vehicular display system according to the fifth embodiment.

With reference to FIG. 21 to FIG. 24, the vehicular display system 1 according to the present embodiment is explained. FIG. 21 is a schematic view that illustrates the movement of the driver's head detected by the vehicular display system according to a fifth embodiment. FIG. 22 is a flowchart that illustrates an example of the flow of the processes of the vehicular display system according to the fifth embodiment. FIG. 23 is a diagram that illustrates an example of the video data captured by the rear camera in the vehicular display system according to the fifth embodiment. FIG. 24 is a diagram that illustrates an example of the video displayed in the rearview monitor in the vehicular display system according to the fifth embodiment.

The vehicular display system 1 according to the present embodiment is different from the vehicular display system 1 according to the first embodiment in a process of the controller 30.

The sensor 4 detects the movement of the driver's head and the direction of the movement. According to the present embodiment, as illustrated in FIG. 21, the reference position HO of the driver's head is set, a right side of the intermediate position between the eyes of the driver at the reference position HO is set as a first range A1, a left side is set as a second range A2, the upper side is set as a third range A3, and the lower side is set as a fourth range A4. The sensor 4 detects a movement in a direction from the reference position HO, which is the intermediate position between the eyes of the driver, to the first range A1 as a rightward movement of the driver's head. The sensor 4 detects a movement in a direction from the reference position HO, which is the intermediate position of the eyes of the driver, to the second range A2 as a leftward movement of the driver's head. The sensor 4 detects a movement in a direction from the reference position HO, which is the intermediate position of the eyes of the driver, to the third range A3 as a upward movement of the driver's head. The sensor 4 detects a movement in a direction from the reference position HO, which is the intermediate position of the eyes of the driver, to the fourth range A4 as a downward movement of the driver's head.

Based on the detection results of the sensor 4, the frequency detecting unit 32 detects the frequency in each direction of the movement of the driver's head. According to the present embodiment, the frequency detecting unit 32 detects the movement of the driver's head separately in a right direction, a left direction, an upward direction, and a downward direction, thereby detecting the frequency of the movement of the driver's head in each direction.

The video data generating unit 33 clips the captured video data 100 in a range that is shifted from the normal clipping range in a direction opposite to the direction of the movement of the driver's head with high frequency, thereby generating video data 120D, video data 120E, video data 120F, or video data 120G. The video data generating unit 33 shifts the normal clipping range within the range of the captured video data 100. For example, the video data generating unit 33 clips the captured video data 100 by shifting the normal clipping range by a predetermined number of pixels in the direction opposite to the direction of the movement of the driver's head with high frequency.

For example, when the frequency of the movement of the driver's head in a right direction is more than a predetermined value, it is assumed that the driver desires to ensure the range of view that is wider than the current range in a left direction. Therefore, the video data generating unit 33 clips the video data 120D that is wider than the normal clipping range on the left side. In this way, when the driver's head in the vehicle moves with high frequency in a right direction, the video data generating unit 33 clips the captured video data 100 by shifting the clipping range in a left direction as compared with the normal clipping range.

For example, when the frequency of the movement of the driver's head in a left direction is more than a predetermined value, it is assumed that the driver desires to ensure the range of view that is wider than the current range in a right direction. Therefore, the video data generating unit 33 clips the video data 120E that is wider than the normal clipping range on the right side. In this way, when the driver's head in the vehicle moves with high frequency in a left direction, the video data generating unit 33 clips the captured video data 100 by shifting the clipping range in a right direction as compared with the normal clipping range.

For example, when the frequency of the movement of the driver's head in an upward direction is more than a predetermined value, it is assumed that the driver desires to ensure the range of view that is wider than the current range in a downward direction. Therefore, the video data generating unit 33 clips the video data 120F that is wider than the normal clipping range on the lower side. In this way, when the driver's head in the vehicle moves with high frequency in an upward direction, the video data generating unit 33 clips the captured video data 100 by shifting the clipping range in a downward direction as compared with the normal clipping range.

For example, when the frequency of the movement of the driver's head in a downward direction is more than a predetermined value, it is assumed that the driver desires to ensure the range of view that is wider than the current range in an upward direction. Therefore, the video data generating unit 33 clips the video data 120G that is wider than the normal clipping range on the upper side. In this way, when the driver's head in the vehicle moves with high frequency in a downward direction, the video data generating unit 33 clips the captured video data 100 by shifting the clipping range in an upward direction as compared with the normal clipping range.

Next, with reference to FIG. 22, the flow of the processes by the controller 30 is explained. At Step S53 and Step S54 to Step S56, the same processes as those at Step S13 and Step S14 to Step S16 according to the first embodiment are performed.

The controller 30 determines whether the frequency of the movement of the head in one direction is more than a predetermined value (Step S51). More specifically, the controller 30 determines whether the frequency of the movement of the head in one direction, detected by the frequency detecting unit 32, is more than a predetermined value. When it is determined that the frequencies of the movements of the head in all the directions are less than the predetermined value (No at Step S51), the controller 30 proceeds to Step S54. When it is determined that the frequency of the movement of the head in one direction is more than the predetermined value (Yes at Step S51), the controller 30 proceeds to Step S52.

The controller 30 clips a wider range in the video data in the direction opposite to the direction of the movement of the driver's head with high frequency (Step S52). More specifically, the controller 30 uses the video data generating unit 33 to clip the captured video data 100 in the clipping range that is shifted from the normal clipping range to generate the video data 120D, the video data 120E, the video data 120F, or the video data 120G.

With reference to FIG. 23 and FIG. 24, for example, an explanation is given of a case where the driver's head moves with high frequency in a right direction. At Step S51, the controller 30 determines that the frequency of the movement of the head in a right direction is equal to or more than the predetermined value (Yes at Step S51). Then, at Step S52, the controller 30 uses the video data generating unit 33 to clip the captured video data 100 in the clipping range that is shifted to the left side from the normal clipping range to generate the video data 120D that is wide on the left side, as illustrated in FIG. 24.

As described above, according to the present embodiment, the video data 120D, the video data 120E, the video data 120F, or the video data 120G is displayed, which is clipped from the captured video data 100 by shifting the clipping range in the direction opposite to the direction of the movement of the driver's head with high frequency. In this manner, according to the present embodiment, appropriate and required information for the driver may be displayed wider in the direction at which the driver desires to look. Thus, according to the present embodiment, the driver is capable of checking the surrounding areas of the vehicle appropriately.

Each component of the vehicular display system 1 illustrated is functionally conceptual and does not necessarily need to be physically configured as illustrated in the drawings. That is, the specific configuration of each device is not limited to that illustrated in the drawings, and all or part of it may be separated or integrated functionally or physically in any unit in accordance with a processing load or a usage situation of the device.

The configuration of the vehicular display system 1 is implemented as for example software by using programs, or the like, loaded into a memory. According to the above-described embodiment, it is explained as functional blocks that are implemented due to cooperation of the hardware or the software. That is, the functional blocks may be implemented in various forms with only hardware, only software, or a combination of them.

The components described above include the ones that may be easily reached by a person skilled in the art and substantially the same ones. Furthermore, the above-described components may be combined as appropriate. Furthermore, the components may be omitted, replaced, or modified in various manners without departing from the scope of the present application.

Although the detecting unit is explained as the sensor, this is not a limitation on the detecting unit. For example, the detecting unit may detect a movement of the driver's head in video of the driver captured by a camera installed near the driver's seat inside the vehicle.

The sensor 4 may detect any driver's action to change the range of view with respect to the rearview monitor 3, and it is not limited to the one for detecting the movement of the driver's head. For example, the sensor 4 may detect movement of the driver's shoulder or movement of the driver's neck.

The sensor 4 may avoid detecting small movement among the movement of the driver's head. For example, the sensor 4 may detect a situation where the driver's head moves in more than a predetermined distance or a situation where it moves with more than a predetermined angle. Thus, a situation where the driver's head moves due to vibration of the vehicle, or the like, may be prevented from being detected as the driver's action for changing the range of view in the vehicle.

Figure 25:
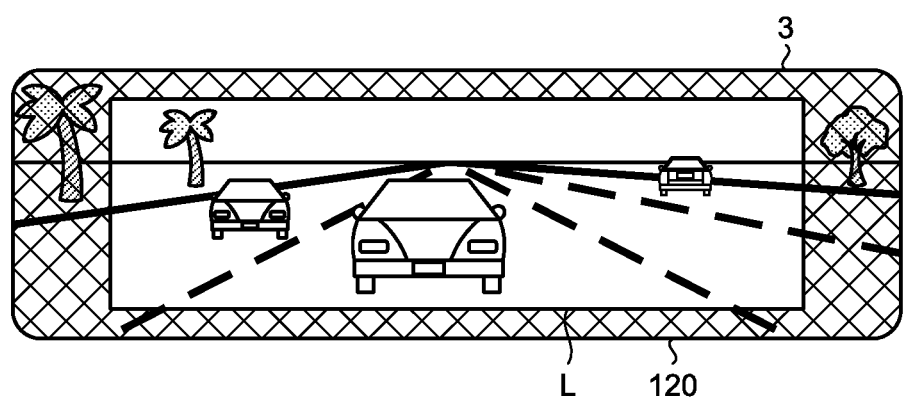
FIG. 25 is a diagram that illustrates another example of the video displayed in the rearview monitor in the vehicular display system.

When the video data 120 clipped in a range wider than the normal clipping range is displayed in the rearview monitor 3, the display controller 34 may display the video data 120 with coloring the area outside the normal video data 110 in translucence with a predetermined degree of transparency, as illustrated in FIG. 25. FIG. 25 is a diagram that illustrates another example of the video displayed in the rearview monitor in the vehicular display system. In this manner, the vehicular display system 1 makes it possible to easily recognize that the video data 120 clipped in a range wider than the normal clipping range is being displayed. Thus, the driver is capable of easily recognizing that the video data 120 displayed in the rearview monitor 3 has a wider range of view than the video data 110.

According to the present application, there is an advantage such that appropriate and required information for the driver is displayed.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display control device comprising:
   a video acquiring unit configured to acquire video data captured by a rear camera configured to capture a rear view of a vehicle;
   a frequency detecting unit configured to detect, for each of multiple directions of movement of a driver's head, a frequency of the driver's action in the vehicle for changing a range of view with respect to a display installed in the vehicle;
   a video data generating unit configured to
   in response to determining that the frequency of the driver's action detected by the frequency detecting unit is less than a predetermined value, clip the video data to generate clipped video data comprising a normal clipping range analogous to a range viewable while the driver's head is in a position to look squarely at an optical rearview mirror, and in response to determining that the frequency of the driver's action detected by the frequency detecting unit is equal to or greater than the predetermined value, clip the video data to generate the clipped video data comprising a shifted clipping range including a range that is not within the normal clipping range and is analogous to a range viewable while the driver's head is moved from the position to look squarely at the optical rearview mirror, wherein the shifted clipping range is obtained by shifting the normal clipping range in a first direction opposite to a second direction of a movement of the driver's head; and a display controller configured to cause the display installed in the vehicle to display the clipped video data generated by the video data generating unit.

2. The vehicular display control device according to claim 1, wherein the video data generating unit is further configured to widen a clipping range of the clipped video data as the frequency detected by the frequency detecting unit increases.

3. The vehicular display control device according to claim 1, wherein the video data generating unit is further configured to narrow a clipping range of the clipped video data as the frequency detected by the frequency detecting unit decreases.

4. The vehicular display control device according to claim 1, wherein the frequency detecting unit is configured to detect, as the frequency of the driver's action, a frequency of the movement of the driver's head in a horizontal direction.

5. The vehicular display control device according to claim 4, wherein the frequency detecting unit is configured to set a reference position with respect to a position of the driver's head and detect, as the frequency of the movement of the driver's head in the horizontal direction, a frequency of the movement in a right-and-left direction with the reference position as a center.

6. The vehicular display control device according to claim 1, further comprising an eye detecting unit configured to detect a direction of eyes of the driver, wherein the video data generating unit is configured to widen a range of the clipped video data as the frequency detected by the frequency detecting unit increases while the direction of the eyes of the driver detected by the eye detecting unit is oriented toward the display.

7. The vehicular display control device according to claim 1, further comprising a vehicle speed acquiring unit configured to acquire a speed of the vehicle, wherein the video data generating unit is configured to widen a range of the clipped video data in response to determining that the frequency detected by the frequency detecting unit is greater than a first threshold value as the speed acquired by the vehicle speed acquiring unit is less than a second threshold value.

8. A vehicular display system comprising:
the vehicular display control device according to claim 1; and at least one of the display, the rear camera, and a detecting unit configured to detect the driver's action in the vehicle for changing the range of view.

9. A vehicular display control method comprising:
acquiring video data captured by a rear camera configured to capture a rear view of a vehicle;

detecting, for each direction of multiple directions of movement of a driver's head, a frequency of the driver's action in the vehicle for changing a range of view with respect to a display installed in front of the driver in the vehicle;

in response to determining that the frequency of the driver's action is less than a predetermined value, clipping the video data to generate clipped video data comprising a normal clipping range analogous to a range viewable while the driver's head is in a position to look squarely at an optical rearview mirror;

in response to determining that the frequency of the driver's action is equal to or greater than the predetermined value, clipping the video data to generate the clipped video data comprising a shifted clipping range including a range that is not within the normal clipping range and is analogous to a range viewable while the driver's head is moved from the position to look squarely at the optical rearview mirror, wherein the shifted clipping range is obtained by shifting the normal clipping range in a first direction opposite to a second direction of a movement of the driver's head; and causing the display installed in front of the driver in the vehicle to display the clipped video data.

10. A non-transitory storage medium that stores a program for causing a computer operating as a vehicular display control device to execute:

acquiring video data captured by a rear camera configured to capture a rear view of a vehicle;

detecting, in each of multiple directions of movement of a driver's head, a frequency of the driver's action in the vehicle for changing a range of view with respect to a display installed in the vehicle;

in response to determining that the frequency of the driver's action is less than a predetermined value, clipping the video data to generate clipped video data comprising a normal clipping range analogous to a range viewable while the driver's head is in a position to look squarely at an optical rearview mirror;

in response to determining that the frequency of the driver's action is equal to or greater than the predetermined value, clipping the video data to generate the clipped video data comprising a shifted clipping range including a range that is not within the normal clipping range and is analogous to a range viewable while the driver's head is moved from the position to look squarely at the optical rearview mirror, wherein the shifted clipping range is obtained by shifting the normal clipping range in a first direction opposite to a second direction of a movement of the driver's head; and causing the display installed in the vehicle to display the clipped video data.

* * * * *